US011626951B2

United States Patent
Ljung et al.

(10) Patent No.: US 11,626,951 B2
(45) Date of Patent: *Apr. 11, 2023

(54) PILOT SIGNALS

(71) Applicant: SONY GROUP CORPORATION, Tokyo (JP)

(72) Inventors: Rickard Ljung, Helsingborg (SE); Basuki Priyanto, Lund (SE); Bo Larsson, Malmö (SE); Zhinong Ying, Lund (SE); Erik Bengtsson, Eslöv (SE)

(73) Assignee: Sony Group Corporation, Tokyo (JP)

( * ) Notice: Subject to any disclaimer, the term of this patent is extended or adjusted under 35 U.S.C. 154(b) by 44 days.

This patent is subject to a terminal disclaimer.

(21) Appl. No.: 17/348,288

(22) Filed: Jun. 15, 2021

(65) Prior Publication Data
US 2021/0314118 A1 Oct. 7, 2021

Related U.S. Application Data

(63) Continuation of application No. 16/094,580, filed as application No. PCT/EP2016/059474 on Apr. 28, 2016, now Pat. No. 11,070,332.

(51) Int. Cl.
| H04L 5/00 | (2006.01) |
| H04W 76/15 | (2018.01) |
| H04B 7/0413 | (2017.01) |
| H04W 4/02 | (2018.01) |
| H04W 72/044 | (2023.01) |

(52) U.S. Cl.
CPC ......... *H04L 5/0048* (2013.01); *H04B 7/0413* (2013.01); *H04W 4/023* (2013.01); *H04W 72/0473* (2013.01); *H04W 76/15* (2018.02)

(58) Field of Classification Search
CPC ... H04B 7/0413; H04L 5/0048; H04L 5/0053; H04W 4/02; H04W 4/023; H04W 4/70; H04W 28/0215; H04W 28/0875; H04W 64/006; H04W 72/04; H04W 72/0473; H04W 76/15
See application file for complete search history.

(56) References Cited

U.S. PATENT DOCUMENTS

| 10,827,546 B2 | 11/2020 | Manolakis et al. |
| 2008/0076462 A1 | 3/2008 | Iochi et al. |
| 2008/0317159 A1 | 12/2008 | Moulsley et al. |

(Continued)

FOREIGN PATENT DOCUMENTS

| CN | 1969483 A | 5/2007 |
| CN | 101023596 A | 8/2007 |

(Continued)

OTHER PUBLICATIONS

"First Office Action and English language translation", CN Application No. 201680085021.5, dated Sep. 28, 2020, 17 pp.

(Continued)

*Primary Examiner* — Frank Duong
(74) *Attorney, Agent, or Firm* — Myers Bigel, P.A.

(57) ABSTRACT

A first terminal receives, on a radio link of a cellular network, at least one uplink pilot signal transmitted by at least one second terminal. The first terminal transmits, on the radio link and to an access node of the cellular network, an uplink report message indicative of at least one property of the received at least one uplink pilot signal.

12 Claims, 24 Drawing Sheets

(56) References Cited

U.S. PATENT DOCUMENTS

| | | | |
|---|---|---|---|
| 2012/0327797 A1* | 12/2012 | Siomina | H04W 36/08 370/252 |
| 2013/0322277 A1* | 12/2013 | Vanganuru | H04W 24/08 370/252 |
| 2014/0349677 A1 | 11/2014 | Xiao et al. | |
| 2016/0095080 A1 | 3/2016 | Khoryaev et al. | |
| 2016/0337805 A1 | 11/2016 | Liao et al. | |
| 2017/0212206 A1 | 7/2017 | Kim et al. | |
| 2017/0288897 A1 | 10/2017 | You et al. | |
| 2018/0063678 A1 | 3/2018 | Zhu et al. | |
| 2018/0115930 A1 | 4/2018 | Belleschi et al. | |
| 2019/0069260 A1 | 2/2019 | Chae et al. | |
| 2019/0261322 A1 | 8/2019 | Xu et al. | |

FOREIGN PATENT DOCUMENTS

| | | |
|---|---|---|
| EP | 2693814 A1 | 2/2014 |
| WO | 2004013987 A1 | 2/2004 |
| WO | 2016032265 A1 | 3/2016 |

OTHER PUBLICATIONS

"International Search Report and Written Opinion of the International Searching Authority corresponding to International Patent Application No. PCT/EP2016/059474, dated Jan. 1, 2017. (8 pages)".

\* cited by examiner

US 11,626,951 B2

PILOT SIGNALS

CROSS REFERENCE TO RELATED APPLICATIONS

This application is a continuation of U.S. patent application Ser. No. 16/094,580, filed Oct. 18, 2018, which itself is a 35 U.S.C. § 371 national stage application of PCT International Application No. PCT/EP2016/059474, filed on Apr. 28, 2016, the contents of which are incorporated herein by reference in its entirety. The above-referenced PCT International Application was published in the English language as International Publication No. WO 2017/186291 A1 on Nov. 2, 2017.

TECHNICAL FIELD

Various embodiments relate to communicating pilot signals on the radio link of a cellular network and to corresponding devices.

BACKGROUND

Pilot signals—sometimes also referred to as reference signals—are typically used for determining the condition of a channel implemented on a radio link of a cellular network (channel sensing). Channel sensing may comprise channel estimation and channel measurements. In reference implementations, pilot signals are reoccurring communicated in order to consider time-dependencies of the channel condition, e.g., due to time-varying multipath effects or Doppler spread. The pilot signals are transmitted having well-defined transmit parameters such as amplitude and phase. From the received pilot signals and based on knowledge of the transmit parameters, it is then possible to deduce properties of the radio link between transmitter and receiver and conclude on a corresponding condition of the channel. Examples of uplink (UL) pilot signals are described for the Third Generation Partnership Project (3GPP) Long Term Evolution (LTE) radio access technology (RAT) in 3GPP Technical Specification (TS) 36.211 V.13.0.0 (2015-12) 5.5; examples of downlink (DL) pilot signals are described for the 3GPP LTE RAT in 3GPP TS 36.211 V.13.0.0 (2015-12) 6.10.

The amplitude with which pilot signals are transmitted defines a transmit power. Tailoring the transmit power can impose certain challenges. Typically, a tradeoff situation exists between increased interference (for large transmit powers) and inaccuracies of channel sensing (for small transmit power).

SUMMARY

Thus, a need for advanced techniques of communicating pilot signals on a radio link exists. This need is met by the features of the independent claims. The dependent claims define embodiments.

According to an example, a method comprises a first terminal receiving, on a radio link of a cellular network, at least one uplink pilot signal. The at least one uplink pilot signal is transmitted by at least one second terminal. The method further comprises the first terminal transmitting, on the radio link and to an access node of the cellular network, an uplink report message. The uplink report message is indicative of at least one property of the received at least one uplink pilot signal.

According to an example, a method comprises an access node receiving an uplink report message indicative of at least one property of at least one uplink pilot signal. The access node receives the uplink report message on a radio link of a cellular network and from a first terminal. The uplink pilot signal is received by the first terminal. The at least one uplink pilot signal being transmitted by at least one second terminal.

According to an example, a terminal attachable to a cellular network comprises an interface. The interface is configured to transceive on a radio link of the cellular network. The terminal further comprises at least one processor. The at least one processor is configured to receive, via the interface, at least one uplink pilot signal. The uplink pilot signal is transmitted by at least one further terminal. The at least one processor is further configured to transmit, via the interface and to an access node of the cellular network, and uplink report message. The uplink report message is indicative of at least one property of the received at least one uplink pilot signal.

According to an example, an access node of a cellular network comprises an interface. The interface is configured to transceive on a radio link of the cellular network. The access node further comprises at least one processor. The at least one processor is configured to receive, via the interface and from a first terminal, and uplink report message. The uplink report message is indicative of at least one property of at least one uplink pilot signal received by the first terminal. The at least one uplink pilot signal is transmitted by at least one second terminal.

According to an example, a computer program product is provided. The computer program product comprises program code executable by at least one processor. Executing the program code causes the at least one processor to perform a method. The method comprises a first terminal receiving, on a radio link of a cellular network, at least one uplink pilot signal. The at least one uplink pilot signal is transmitted by at least one second terminal. The method further comprises the first terminal transmitting, on the radio link and to an access node of the cellular network, an uplink report message. The uplink report message is indicative of at least one property of the received at least one uplink pilot signal.

According to an example, a computer program product is provided. The computer program product comprises program code executable by at least one processor. Executing the program code causes the at least one processor to perform a method. The method comprises an access node receiving an uplink report message indicative of at least one property of at least one uplink pilot signal. The access node receives the uplink report message on a radio link of a cellular network and from a first terminal. The uplink pilot signal is received by the first terminal. The at least one uplink pilot signal being transmitted by at least one second terminal.

According to an example, a method comprises, in a first subset of a sequence of transmission intervals: communicating, on the radio link of a cellular network and according to a resource mapping, pilot signals having a non-zero first transmit power. The method further comprises, in the second subset of the sequence of transmission intervals: communicating, on the radio link and according to the resource mapping, the pilot signals having a non-zero second transmit power. The second transmit power is larger than the first transmit power.

According to an example, a device comprises an interface. The interface is configured to transceive on a radio link of a cellular network. The device further comprises at least one processor. The at least one processor is configured to communicate, on a radio link of the cellular network and according to a resource mapping, pilot signals having a non-zero first transmit power in a first subset of a sequence of transmission intervals. The at least one processor is further configured to communicate, on the radio link and according to the resource mapping, the pilot signals having a non-zero second transmit power which is larger than the first transmit power in a second subset of the sequence of transmission intervals.

According to an example, a computer program product is provided. The computer program product comprises program code executable by at least one processor. Executing the program code causes the at least one processor to perform a method. The method comprises, in a first subset of a sequence of transmission intervals: communicating, on the radio link of a cellular network and according to a resource mapping, pilot signals having a non-zero first transmit power. The method further comprises, in the second subset of the sequence of transmission intervals: communicating, on the radio link and according to the resource mapping, the pilot signals having a non-zero second transmit power. The second transmit power is larger than the first transmit power.

According to an example a method comprises a first device receiving, on a radio link of a cellular network, at least one uplink or downlink pilot signal transmitted by at least one second device. The method further comprises the first device transmitting, on the radio link and to an access node of the cellular network, a report message indicative of at least one property of the received at least one uplink or downlink pilot signal.

According to an example a method comprises an access node of a cellular network receiving, on a radio link of the cellular network and from a first device, a report message indicative of at least one property of at least one uplink or downlink pilot signal received by the first device, the at least one uplink or downlink pilot signal being transmitted by at least one second device.

According to an example, a device comprises: an interface configured to transceive on a radio link of the cellular network; at least one processor configured to receive, via the interface, at least one uplink or downlink pilot signal transmitted by at least one further device, wherein the at least one processor is further configured to transmit, via the interface and to an access node of the cellular network, a report message indicative of at least one property of the received at least one uplink or downlink pilot signal.

According to an example, an access node of a cellular network comprises: an interface configured to transceive on a radio link of the cellular network, at least one processor configured to receive, via the interface and from a first device, a report message indicative of at least one property of at least one uplink or downlink pilot signal received by the first device, the at least one uplink or downlink pilot signal being transmitted by at least one second device.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
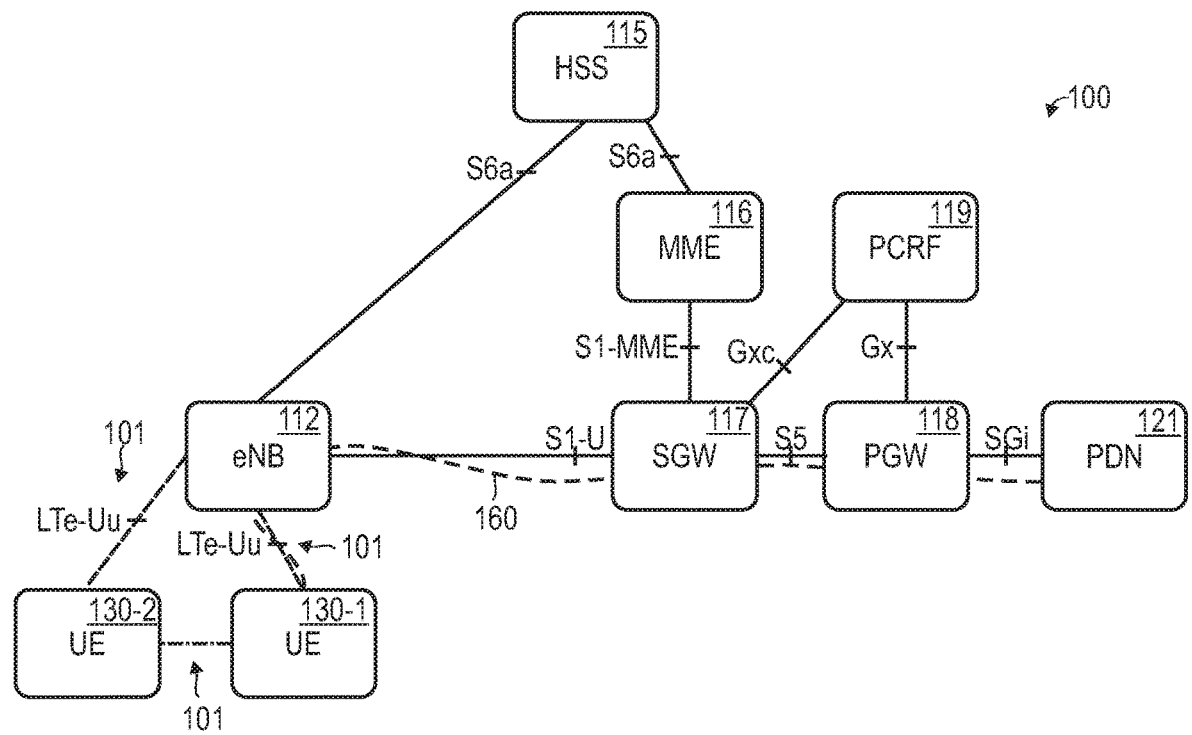
FIG. 1 is a schematic illustration of a cellular network according to various embodiments.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of communicating pilot signals on a radio link of a cellular network are described. The techniques may be applied to uplink (UL) pilot signals communicated from a terminal to an access node. Alternatively or additionally, the techniques may be applied to downlink (DL) pilot signals communicated from the access node to the terminal. It is also possible, alternatively or additionally, to employ the techniques on pilot signals communicated in-between two terminals for device-to-device (D2D) communication, i.e., to sidelink pilot signals or relay pilot signals.

Hereinafter, techniques are described which enable to flexibly tailor transmitting and/or receiving (communicating) of the pilot signals. Tailoring may relate to flexibly setting certain transmit properties of the pilot signals such as the amplitude. Tailoring may relate to a first device flexibly receiving pilot signals which are intended for a different, second device and which are transmitted by a third device.

In some examples the techniques relate to dynamically adapting the transmit power of pilot signals. In some examples, the transmit power of pilot signals can be adjusted in-between two levels, three levels, or more levels over the course of time. In some examples, the transmit power of the pilot signals is boosted temporarily and occasionally to a second transmit power which is higher than a baseline first transmit power.

By dynamically adapting the transmit power, it is possible to enable a larger number of devices to receive the power-boosted pilot signal. Therefore, the larger number of devices such as further access nodes and/or terminals can benefit from the information derivable from the received pilot signal. E.g., channel sensing may be implemented at a high accuracy, because more information is available.

In some examples, the techniques relate to a first terminal receiving at least one uplink pilot signal transmitted by at least one second terminal. The at least one uplink pilot signal may be directed to/intended for an access node of the cellular network. Thus, the first terminal may intercept this communication and receive the at least one uplink pilot signal.

By receiving uplink pilot signals by the first terminal, it is possible to gather additional information on the condition of channels implemented on the radio link. It may also be possible to perform positioning of the first terminal with respect to at least one of the at least one second terminal and/or the access node.

In some examples, techniques are provided which enable to reduce/mitigate interference between multiple devices communicating pilot signals. In some examples, interference is mitigated by orthogonally communicating pilot signals between the multiple devices. Orthogonality may be achieved by using time-division multiple access (TDMA), code-division multiple access (CDMA), and/or frequency-division multiple access (FDMA). In some examples, inter-cell interference is mitigated by scheduling pilot signals across multiple cells. In some examples, intra-cell and/or inter-cell interference is mitigated by appropriately setting the transmit power of pilot signals.

The techniques described herein may be applied to various use-cases, including the evolution of the existing LTE system and the next generation of cellular network (e.g. New Radio (NR) access technologies for 5G cellular network). A particular use-case is a Multiple Input Multiple Output (MIMO) scenario, such as a Massive MIMO (MAMI) scenario. An initial phase of MAMI has just been developed in 3GPP as part of the LTE evolution and it is known as Full Dimension (FD)-MIMO. See 3GPP TS 36.897. MAMI is commonly deployed by using Massive base-station antennas and a few terminal antennas with the main objective to obtain higher order multi user MIMO .MAMI offers high spatial diversity. MIMO systems may use multiple transmit antennas and/or multiple receive antennas for communication on a radio link at an access node. MIMO enables implementation of coding techniques which use the temporal as well as the spatial dimension for transmitting information. The coding provided in MIMO systems allows for considerable spectral efficiency and energy efficiency. A MAMI base station typically includes a comparably large number of antennas, e.g., several tens or even in excess of one hundred antennas with associated receiver circuitry. The extra antennas of the MAMI device allow radio energy to be spatially focused in transmissions; as well as a directional sensitive reception. Such techniques improve spectral efficiency and radiated energy efficiency. MAMI scenarios may benefit from highly accurate channel sensing which becomes possible by the techniques described herein.

FIG. 1 illustrates the architecture of a cellular network 100 according to some examples implementations. In particular, the cellular network 100 according to the example of FIG. 1 implements the 3GPP LTE architecture, sometimes referred to as evolved packet system (EPS). This, however, is for exemplary purposes only. In particular, various scenarios will be explained in the context of a radio link 101 between terminals 130-1, 130-2 and the cellular network 100 operating according to the 3GPP LTE architecture for illustrative purposes only. Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks.

Two terminals 130-1, 130-2 are connected via the radio link 101 to an access node 112 of the cellular network 100. The two terminals 130-1, 130-2 may also be connected via the radio link 101 with each other (D2D communication or sidelink communication). The access node 112 and the terminals 130-1, 130-2 implement the evolved UMTS terrestrial radio access technology (E-UTRAN); therefore, the access point node 112 is an eNB 112.

E.g., the terminals 130-1, 130-2 may be selected from the group comprising: a smartphone; a cellular phone; a tablet; a notebook; a computer; a smart TV; a Machine Type Communication (MTC) device, an Internet-of-Things device; etc.

Figure 2:
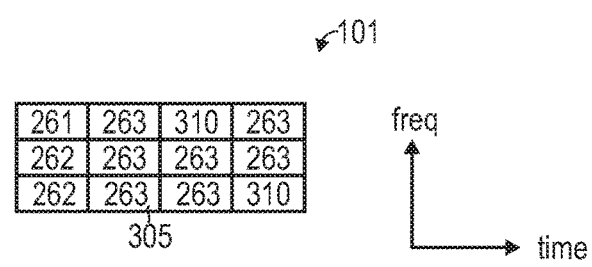
FIG. 2 is a schematic illustration of channels implemented on a radio link of the cellular network according to various embodiments.

Communication on the radio link 101 can be in UL and/or DL direction, or D2D. Details of the radio link 101 are illustrated in FIG. 2. The radio link 101 implements a plurality of channels 261-263. Radio resources 305 associated with each channel 261-263. Each channel 261-263 comprises a plurality of resources 305 which are defined in time domain and frequency domain. The resources 305 are typically structured by appropriate transmission intervals, e.g., in case of the LTE RAT into time slots, subframes, frames, and radio frames (all not shown in FIG. 2).

E.g., the resources 305 may correspond to individual symbols such as Orthogonal Frequency Division Multiplex (OFDM) symbols in 3GPP LTE RAT. E.g., the resources 305 may correspond to such individual resource elements or a plurality of resources elements, sometimes referred to as resource blocks. Resource blocks comprise a plurality of sub-carriers. Thus, the resources may have different bandwidths depending on the particular implementation, e.g., 15 kHz or 180 kHz.

Control channels 261, 262 may be associated with control messages. The control messages may configure operation of the terminals 130-1, 130-2, the eNB 112, and/or the radio link 101. E.g., radio resource control (RRC) messages and/or HARQ ACKs and NACKs can be exchanged via the control channel. According to the E-UTRAN RAT, the control channels 261, 262 may thus correspond to a Physical Downlink Control Channel (PDCCH) and/or a Physical Uplink Control Channel (PUCCH) and/or a Physical Hybrid ARQ indicator Channel (PHICH).

Further, a shared channel 263 is associated with a payload messages carrying higher-layer user-plane data packets associated with a given service implemented by the terminals 130-1, 130-2 and the eNB 112. According to the E-UTRAN RAT, the shared channel 263 may be a Physical Downlink Shared Channel (PDSCH) or a Physical Uplink Shared Channel (PUSCH). The shared channel 263 may sometimes also be used for sidelink communication.

It is also possible to implement a relay channel. The relay channel allows communication of data between a first terminal 130-1, 130-2 and an eNB 112 via an intermediate relay. The intermediate relay may be implemented by a second terminal 130-1, 130-2. See, e.g., 3GPP Technical Report (TR) 36.806 V.9.0.0 (2010-03). The various channels 261-263 can be implemented using MIMO or MAMI techniques (MIMO channel). Here, by using a plurality of transmit and/or receive antennas, spatial diversity is obtained.

Some resources 305 are used for communicating pilot signals 310. The pilot signals 310 enable channel sensing. The pilot signals 310 may be uplink pilot signals, downlink pilot signals, and/or sidelink pilot signals. The pilot signals 310 may be cell-specific and/or terminal-specific. The pilot signals 310 may have well-defined transmit properties. Based on a comparison of receive properties with the transmit properties, it is possible to conclude on the channel condition. Each pilot signal may comprise one or more symbols, e.g., OFDM symbols. The symbols of the pilot signals may be generated by a sequence generator. Different pilot signals communicated in the same resources 305 may be encoded orthogonally with respect to each other by CDMA techniques; this may be achieved by appropriately designing the sequence generator. A sequence of subsequently communicated pilot signals 310 can be generated based on the sequence generator. The sequence generator can map, e.g., a certain resource 305 at which the respective pilot signal is communicated to a real and imaginary parts of the respective OFDM symbol. Thus, the particular symbol values of the pilot signals 310 may vary from instance to instance according to the sequence generator.

Turning again to FIG. 1, the eNB 112 is connected with a gateway node implemented by a serving Gateway (SGW) 117. The SGW 117 may route and forward payload data and may act as a mobility anchor during handovers of the terminals 130-1, 130-2 between neighboring cells.

The SGW 117 is connected with a gateway node implemented by a packet data network Gateway (PGW) 118. The PGW 118 serves as a point of exit and point of entry of the cellular network 110 for data towards a packet data network 121 (PDN): for this purpose, the PGW 118 is connected with the PDN 121. There may be more than one PDN 121. Each PDN 121 is uniquely identified by an access point name (APN). The APN is used by the terminals 130-1, 130-2 to seek access to the to a certain PDN 121, e.g., the Internet.

The PGW 118 can be an endpoint of an end-to-end connection 160 (dashed line in FIG. 1) for packetized payload data of the terminal 130-1. The end-to-end connection 160 may be used for communicating data of a particular service. Different services may use different end-to-end connections 160 or may share, at least partly, a certain end-to-end connection. The end-to-end connection 160 may be implemented by one or more bearers which are used to communicate service-specific data. An EPS bearer which is characterized by a certain set of quality of service parameters indicated by the QoS class identifier (QCI).

Figure 3:
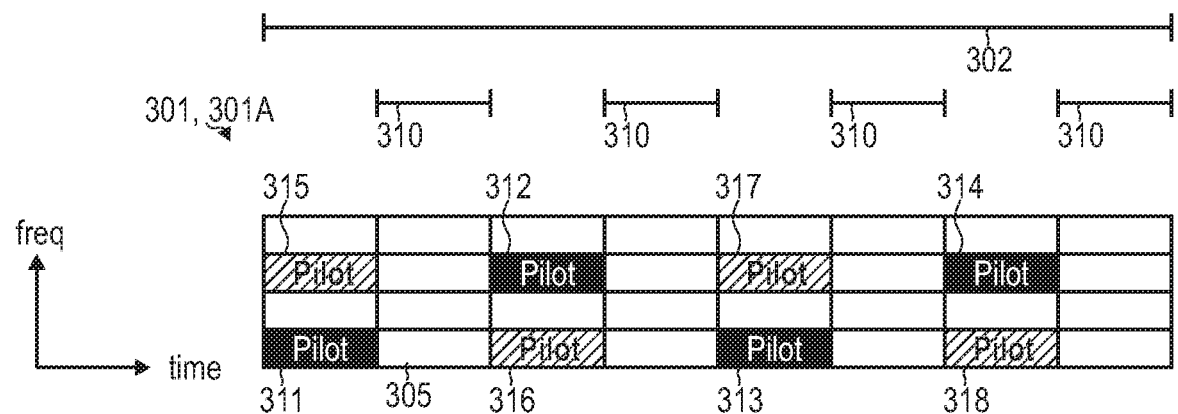
FIG. 3 is a schematic illustration of a repetitive resource mapping for pilot signals communicated in a sequence of transmission intervals according to various embodiments, wherein the repetitive resource mapping according to the embodiment of FIG. 3 employs frequency-division multiple access in order to mitigate interference between multiple terminals communicating pilot signals.

FIG. 3 illustrates aspects with respect to allocation of resources 305 for communication of pilot signals 311-318. In particular, FIG. 3 illustrates aspects with respect to repetitive resource mappings 301, 301A. While hereinafter reference is predominantly made to repetitive resource mappings, in other examples also non-repetitive resource mappings may be employed. The resource mappings 301, 301A define the occupation of resources 305 for a certain type of pilot signal for a certain terminal 130-1, 130-2. Different resource mappings 301, 301A may avoid interference by techniques of FDMA, TDMA, and/or CDMA.

In FIG. 3, an excerpt of the repetitive resource mappings 301, 301A for a given transmission interval 302 is illustrated; e.g., the transmission interval 302 may be a radio frame, a frame, a subframe, or a time slot. Repetitions of the repetitive resource mappings 301, 301A may be implemented for subsequent time intervals.

In the example of FIG. 3, first pilot signals 311-314 and second pilot signals 315-318 are illustrated. The first pilot signals 311-314 (full black in FIG. 3) are communicated according to the repetitive resource mapping 301 between a terminal 130-1 and the eNB 112; the second pilot signals 315-318 are communicated according to the repetitive resource mapping 301A between a terminal 130-2 and the eNB 112. E.g., the first pilot signals 311-314 may be UL pilot signals transmitted by the terminal 130-1 and received by the eNB 112; it is also possible that the first pilot signals 311-314 are DL pilot signals transmitted by the eNB 112 and received by the terminal 130-1. Similar considerations apply to the second pilot signals 315-318 with respect to the terminal 130-2.

It is possible that each type of pilot signal has an associated unique repetitive resource mapping 301, 301A. I.e., different repetitive resource mappings 301, 301A may distinguish different types of pilot signals from each other. It is also possible that different terminals 130-1, 130-2 employ different repetitive resource mappings 301, 301A; this may allow the eNB 112 to distinguish between the identities of the originators of received UL pilot signals.

In FIG. 3, silent periods 307 of the terminal 130-1 are illustrated; the terminal 130-1 does not transmit during the silent periods 307. By implementing such silent periods 307 interference can be mitigated with respect to further terminals which require protected resources for communication of, e.g., for the pilot signals (not illustrated in FIG. 3).

As can be seen from FIG. 3, in order to avoid interference between communicating the first pilot signals 311-314 and communicating the second pilot signals 315-318, FDMA techniques are employed with respect to the repetitive resource mappings 301, 301A.

Figure 4:
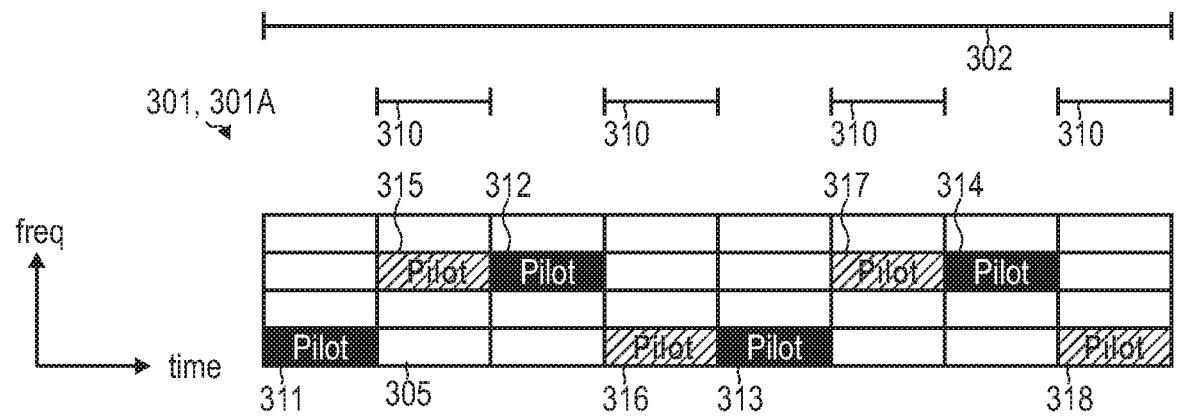
FIG. 4 is a schematic illustration of repetitive resource mapping for pilot signals communicated in subsequent transmission intervals according to various embodiments, wherein the repetitive resource mapping according to the embodiment of FIG. 4 employs time-division multiple access in order to mitigate interference between multiple terminals communicating pilot signals.

FIG. 4 illustrates aspects with respect to allocation of resources 305 for communication of pilot signals 311-318. FIG. 4 generally corresponds to FIG. 3. However, in the scenario of FIG. 4, instead of employing FDMA techniques for communicating the first pilot signals 311-314 and the second pilot signals 315-318, respectively, TDMA techniques are employed with respect to the repetitive resource mappings 301, 301A.

As can be seen from FIG. 4, the terminal 130-2 communicates the pilot signals 315-318 during the silent periods 307 of the terminal 130-1. Because of this, the terminal 130-1 is able to receive the second pilot signals 315-318 communicated by the terminal 130-2. Generally, it would also be possible that the terminal 130-1 in the scenario of FIG. 3 receives the second pilot signals 315-318 communicated by the terminal 130-2; e.g., such a scenario may be facilitated by duplex communication capability of the terminal 130-1.

The repetitive resource mappings 301, 301A may be specified by control signaling. E.g., a plurality of candidate resource mappings may be predefined. E.g., based on the control signaling, the particular resource mapping applicable to communication of the pilot signals 311-314, 315-318 may be selected. E.g., the Physical Cell Identity may be associated with a particular resource mapping, see 3GPP TS 36.211 V13.1.0, 2016, Chapter 6.10.1.

The resource mappings 301, 301A of FIGS. 3 and 4 can be repeatedly applied. The periodicity of the repetitions may correspond to the transmission interval 302 or multiple transmission intervals 302.

Hereinafter, with respect to the signaling diagrams of FIGS. 8A, 8B, 9A, 9B, 10, 11A, 11B, 20-25 reference is made to pilot signals. These pilot signals can be configured according to the pilot signals 310-318 as discussed with respect to FIGS. 3A and 3B.

Figure 5:
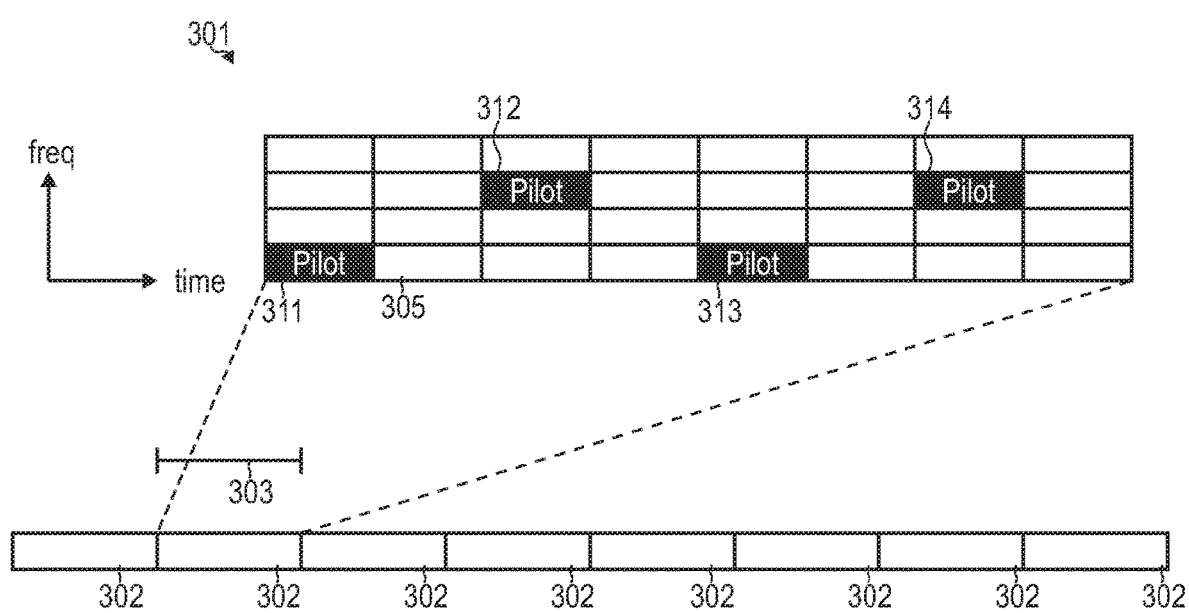
FIG. 5 is a schematic illustration of repetitions of a repetitive resource mapping for pilot signals according to various embodiments.

FIG. 5 illustrates aspects with respect to repetitions of the repetitive resource mapping 301. In FIG. 5, the mapping of the repetitive resource mapping 301 to subsequent transmission intervals 302 is illustrated. In the example of FIG. 5, the repetitive resource mapping 301 is repeated for each transmission interval 302; thus, a periodicity 303 of the repetitive resource mapping 301 corresponds to the duration of the transmission interval 302.

Figure 6:
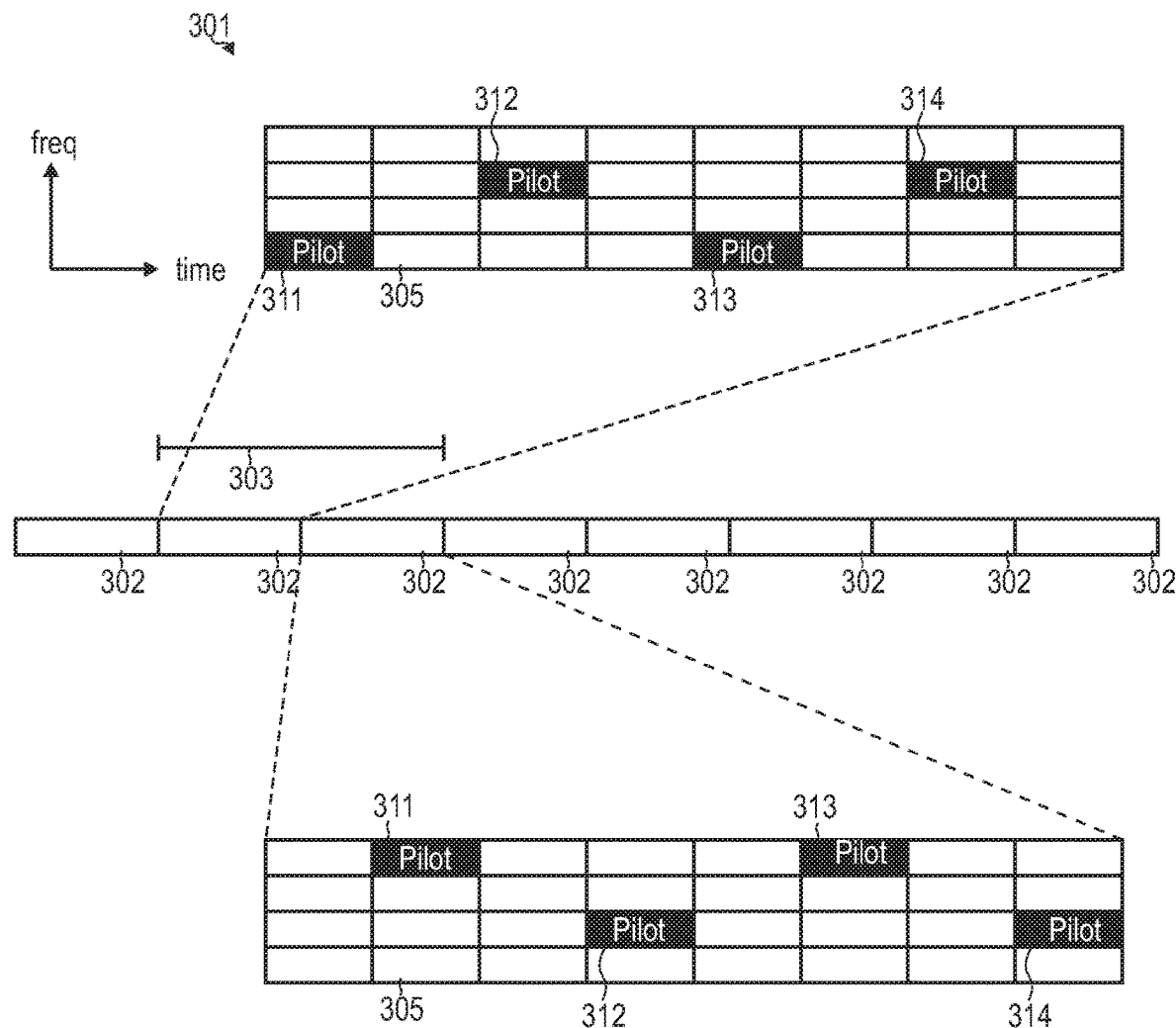
FIG. 6 is a schematic illustration of repetitions of a repetitive resource mapping for pilot signals according to various embodiments.

FIG. 6 illustrates aspects with respect to repetitions of the repetitive resource mapping 301. In FIG. 6, the mapping of the repetitive resource mapping 301 to subsequent transmission intervals 302 is illustrated. In the example of FIG. 6, the repetitive resource mapping 301 is repeated every second transmission interval 302; thus, the periodicity 303 of the repetitive resource mapping 301 corresponds to twice the duration of the transmission interval 302. In other examples, even longer periodicities are conceivable. Different repetitive resource mappings may have different periodicities.

Figure 7:
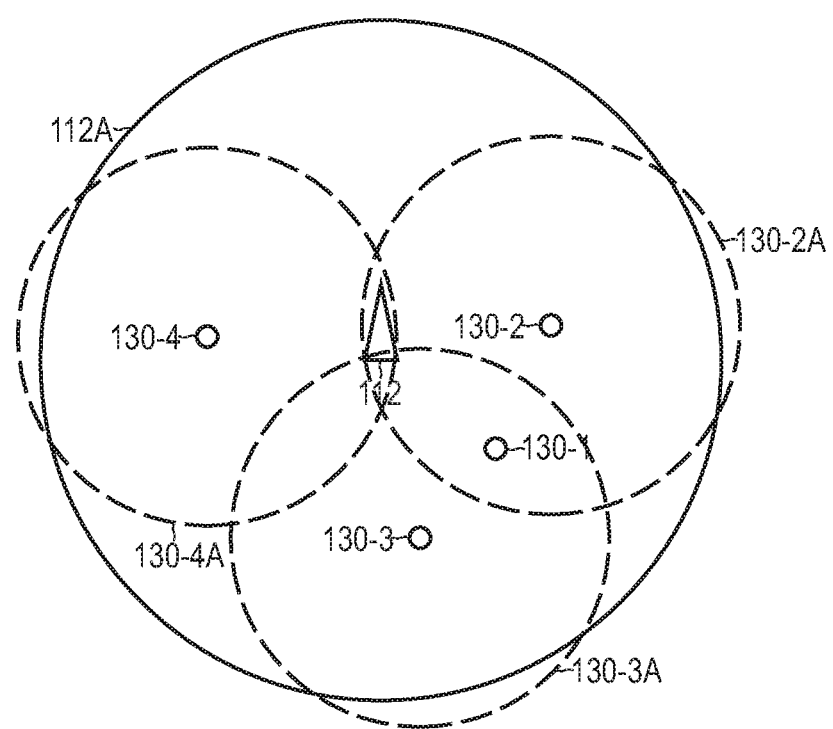
FIG. 7 schematically illustrates a first terminal receiving uplink pilot signals transmitted by second terminals according to various embodiments.

FIG. 7 illustrates aspects with respect to a terminal 130-1 receiving the UL pilot signals transmitted by terminals 130-2, 130-3. In FIG. 7, the terminal 130-1 is positioned in between the terminals 130-2, 130-3. The terminals 130-2, 130-3 transmit UL pilot signals. The UL pilot signals are intended for the eNB 112. Thus, the transmit power of the UL pilot signals transmitted by the terminals 130-2, 130-3, 130-4 is set such that the eNB 112 defining a cell 112A can receive the UL pilot signals. The eNB 112 may implement channel sensing according to reference techniques based on the received UL pilot signals.

The UL pilot signals are intended for the eNB 112 by communicating them according to a certain repetitive resource mapping and/or generating a sequence of the pilot signals according to a certain sequence generator, the certain repetitive resource mapping and/or the certain sequence generator being pre-negotiated between the eNB and the transmitting terminals 130-2, 130-3. Because the UL pilot signals are intended for the eNB 112, the eNB 112 is configured to determine at least one property of the UL pilot signals and estimate a condition of a channel 261-263 based on the determined at least one property. Thus, the eNB 112 may perform channel sensing based on the received UL pilot signals.

The UL pilot signals are associated with a certain transmit power. The transmit power defines the coverage area 130-2A, 130-3A at which the pilot signals can be received (illustrated in FIG. 7 by the dashed line). As can be seen from FIG. 7, the terminal 130-1 can receive the UL pilot signals transmitted by the terminals 130-2, 130-3. The terminal 130-1 cannot receive the UL pilot signals transmitted by a terminal 130-4.

Figure 8A:
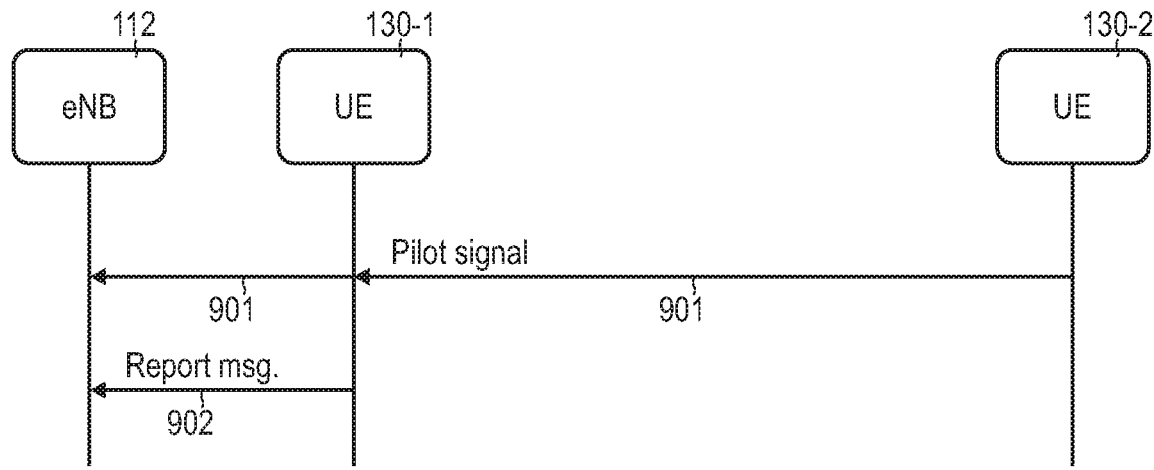
FIG. 8A is a signaling diagram illustrating a first terminal receiving an uplink pilot signal transmitted by a second terminal and further illustrating the first terminal transmitting an uplink report message indicative of a property of the received uplink pilot signal according to various embodiments.

FIG. 8A illustrates aspects with respect to the terminal 130-1 receiving the UL pilot signals 901 transmitted by the terminal 130-2. FIG. 8A is a signaling diagram illustrating the communication between the eNB 112 and the terminal 130-1 and the terminal 130-2.

The terminal 130-2 transmits an UL pilot signal 901. The UL pilot signal 901 may be intended for the eNB 112. E.g., the UL pilot signal 901 may be cell-specific for the cell 112A and/or may be terminal specific for the terminal 130-2. The eNB 112 receives the UL pilot signal 901. The eNB 112 performs channel sensing based on the received UL pilot signal 901.

Communication of the UL pilot signal 901 is intercepted by the terminal 130-1. The terminal 130-1 receives the UL pilot signal 901 transmitted by the terminal 130-2. Then, the terminal 130-1 transmits, on the radio link 101 to the eNB 112, and UL report message 902 indicative of a property of the received UL pilot signal 901. The eNB 112 receives, on the radio link 101 and from the terminal 130-1, the UL report message 902 indicative of the property of the UL pilot signal 901 received by the terminal 130-1 and transmitted by the terminal 130-2.

The UL report message 902 may enable the eNB 112 gathering additional information on the condition of the radio link 101 in the area of the terminal 130-1. Based on this, channel sensing performed by the eNB 112 may be executed at a higher accuracy. Remote channel sensing may be performed.

E.g., it is possible that the UL report message 902 is indicative of one or more properties selected from the group comprising: an amplitude of the received UL pilot signal 901; a phase of the received UL pilot signal 901; a resource 305 at which the received UL pilot signal 901 is communicated; a time offset of the received UL pilot signal 305, e.g., with respect to a synchronized clock of the eNB 112 and the terminals 130-1, 130-2; and an angle of arrival of the received UL pilot signal 901. Such properties allow for accurate channel sensing. Remote channel sensing may be performed.

Figure 8B:
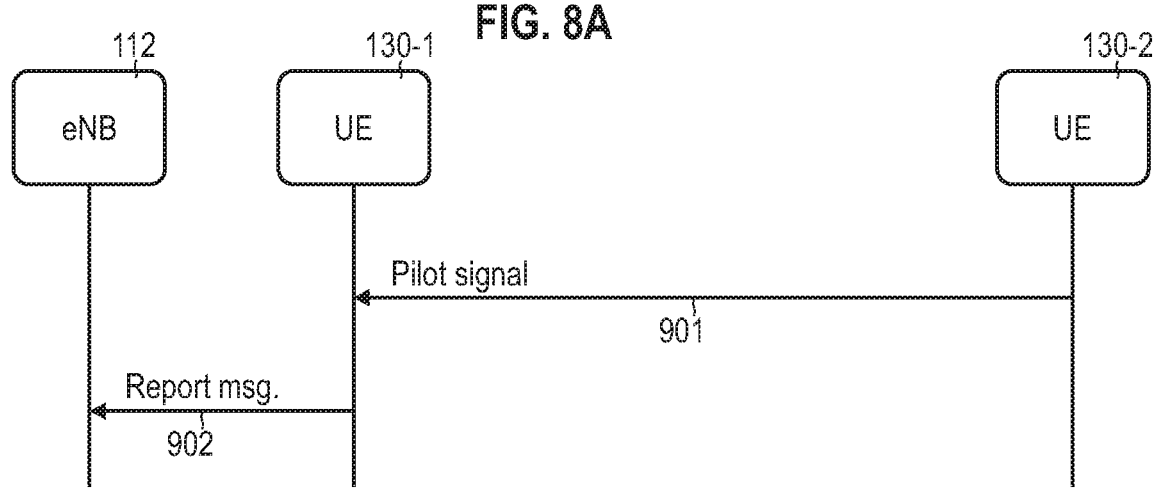
FIG. 8B is a signaling diagram illustrating a first terminal receiving an uplink pilot signal transmitted by a second terminal and further illustrating the first terminal transmitting an uplink report message indicative of a property of the received uplink pilot signal according to various embodiments.

FIG. 8B illustrates aspects with respect to the terminal 130-1 receiving the UL pilot signal 901 transmitted by the terminal 130-2. FIG. 8B generally corresponds to FIG. 8A; however, in the example of FIG. 8B, the UL pilot signal 901 is only received by the terminal 130-1, but not received by the eNB 112. Such a scenario may be applicable where the terminal 130-1 is attached to the cellular network 100 via the eNB 112, but where the terminal 130-2 is attached to the cellular network via a further access node (not illustrated in FIG. 8B). The further access node may receive the pilot signal 901 and may perform channel sensing based on the received pilot signal 901. Thus, in the various examples described herein, it is not germane that the UL report message 902 is intended for the same access node as the at least one UL pilot signal 901.

In the examples of FIGS. 8A, 8B, the UL report message 902 is indicative of at least one property of a single UL pilot signal 901. In other examples, information on a plurality of UL pilot signals may be aggregated into a single UL report message. Thereby, signaling overhead is reduced and traffic on the radio link 101 is reduced.

Figure 9A:
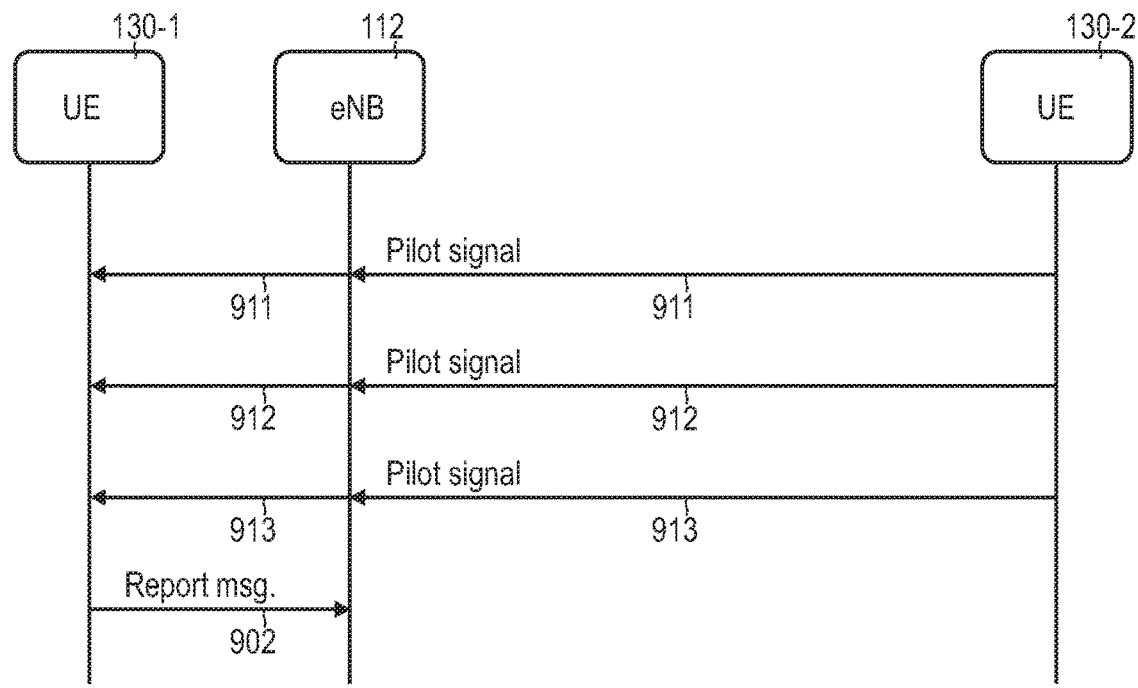
FIG. 9A is a signaling diagram illustrating a first terminal receiving a plurality of uplink pilot signals transmitted by a second terminal and further illustrating the first terminal transmitting an uplink report message indicative of a property of the received plurality of uplink pilot signals according to various embodiments.

FIG. 9A illustrates aspects with respect to the terminal 130-1 receiving a plurality of UL pilot signals 911-913 transmitted by the terminal 130-2. FIG. 9A generally corresponds to the example of FIG. 8A, however, in the example of FIG. 9A information on a plurality of UL pilot signals 911-913 is aggregated into the UL report message 902 to reduce signaling overhead.

While in the example of FIG. 9A all UL pilot signals 911-913 originate from the same terminal 130-2, in other examples it is possible that the terminal 130-1 receives a plurality of pilot signals originating from a plurality of terminals. It is also possible to aggregate information on a plurality of pilot signals originating from a plurality of terminals into a single UL report message 902. In a scenario, channel sensing may thus be facilitated by including an indicator indicative of the identity of the originator of the received UL pilot signals in the UL report message 902. The indicator may be explicitly or implicitly indicative of the identity, e.g., via the particular repetitive resource mapping 301, 301A.

In various examples, it is possible that the UL report message 902 includes the at least one property resolved for each one of the UL pilot signals 911-913. In other examples, it is also possible that the UL report message 902 includes an average or an otherwise derived value which is determined based on a combination of the plurality of received UL pilot signals 911-913. E.g., certain properties such as the amplitude and/or the phase of the received UL pilot signals 911-913 may be averaged and the corresponding average may be included in the UL report message 902. Thereby, signaling overhead and traffic on the radio link 101 is reduced.

Figure 9B:
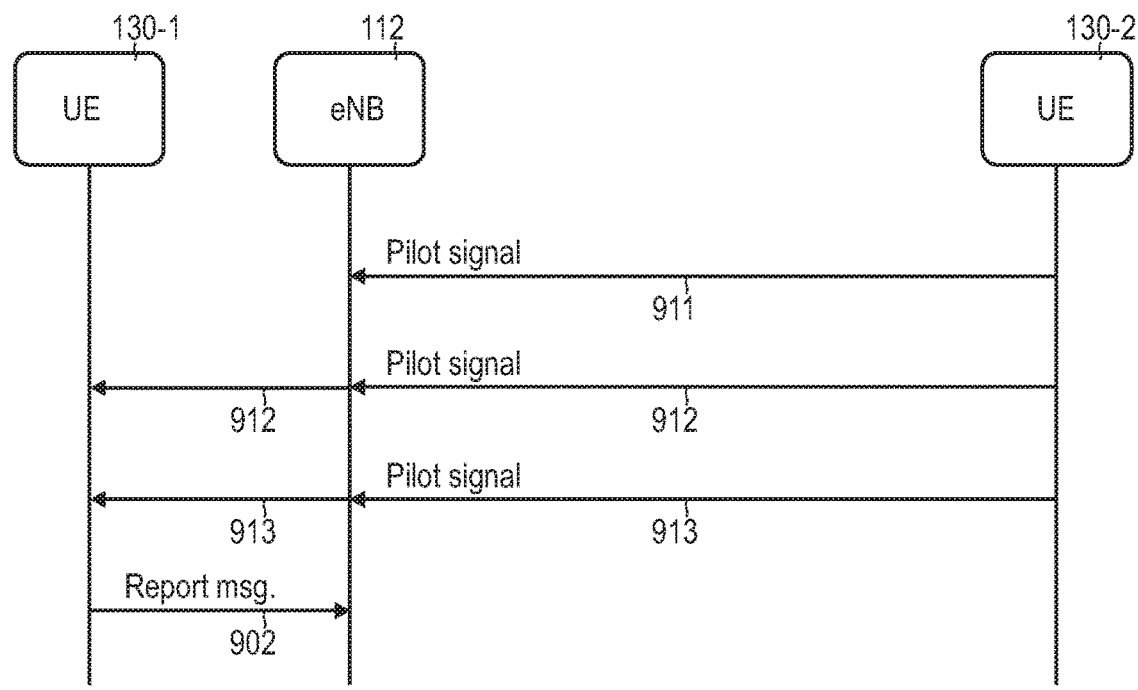
FIG. 9B is a signaling diagram illustrating a first terminal receiving a plurality of uplink pilot signals transmitted by a second terminal and further illustrating the first terminal transmitting an uplink report message indicative of a property of the received plurality of uplink pilot signals according to various embodiments.

FIG. 9B illustrates aspects with respect to the terminal 130-1 receiving a plurality of UL pilot signals 911-913 transmitted by the terminal 130-2. FIG. 9B generally corresponds to the example of FIG. 9A, however, in the example of FIG. 9B the terminal 130-1 does not receive the UL pilot signal 911.

A first reason for the terminal 130-1 not receiving the UL pilot signal 911 may be that the UL pilot signal 911 is transmitted at a lower transmit power by the terminal 130-2 if compared to the UL pilot signals 912, 913. E.g., the terminal 130-2 may be configured to temporarily boost the transmit power of the UL pilot signals 912, 913 in order to facilitate reception thereof by the terminal 130-1. Thus, the terminal 130-1 may be out-of-range with respect to the UL pilot signal 911 transmitted at the lower transmit power; while the terminal 130-1 may be within the range 130-2A with respect to the UL pilot signals 912, 913.

The second reason for the terminal 130-1 not receiving the UL pilot signal 911 may be that the terminal 130-1, in between communication of the UL pilot signals 911, 912, has moved into range 130-2A of UL pilot signal transmission by the terminal 130-2.

In a scenario according to FIG. 9B, channel sensing may thus be facilitated by including resource identification information of the received UL pilot signals 912, 913 in the UL report message 902. Resource identification information may include resource location information and/or timestamp information.

Figure 10A:
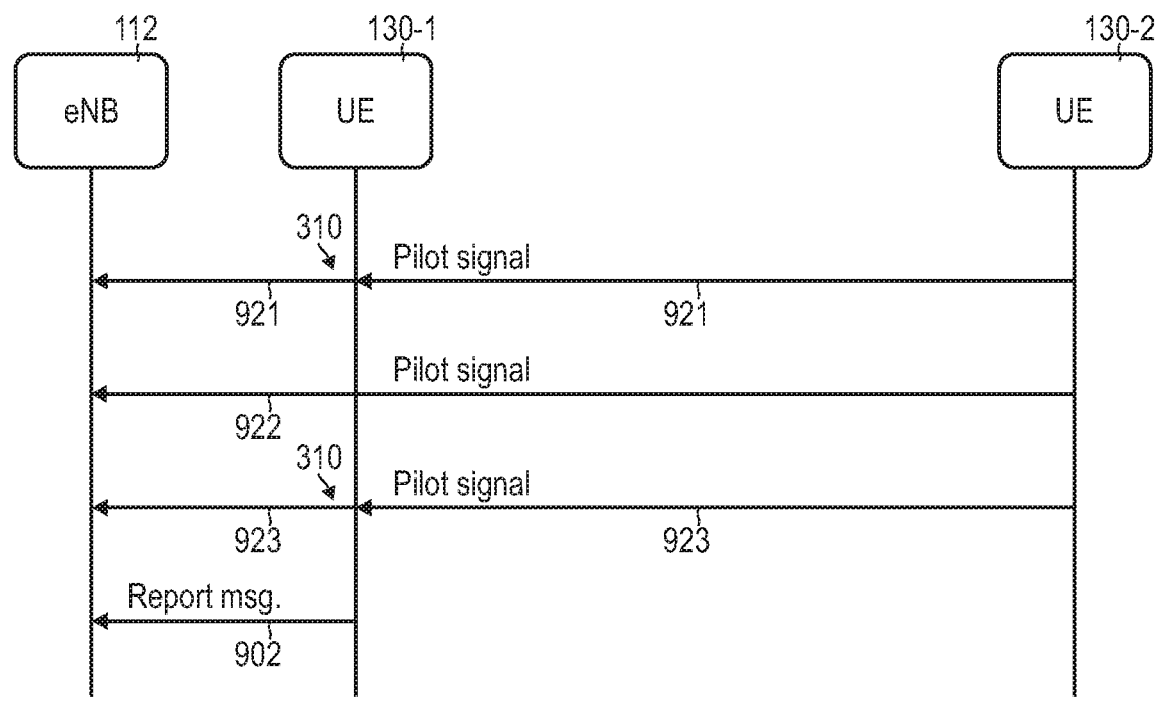
FIG. 10A is a signaling diagram illustrating a first terminal receiving a plurality of uplink pilot signals transmitted by a second terminal and further illustrating the first terminal transmitting an uplink report message indicative of a property of the received plurality of uplink pilot signals according to various embodiments, wherein in the scenario of FIG. 10A the first terminal receives the uplink pilot signals during silent periods.

FIG. 10A illustrates aspects with respect to the terminal 130-1 receiving a plurality of UL pilot signals 921, 923 transmitted by the terminal 130-2. FIG. 10A generally corresponds to the example of FIG. 9A; however, in the example of FIG. 10A, the terminal 130-1 does not receive the pilot signal 922. This is because the UL pilot signal 922 is not communicated during a silent period 307. In the example of FIG. 10A, the terminal 130-1 is only able to receive pilot signals during a silent period 307. This may be because the terminal 130-1 is restricted in hardware operation.

Thus, generally, according to the various examples described herein it is not mandatory that the terminal 130-1 receives all of a sequence of the UL pilot signals transmitted by the terminal 130-2 in the sequence of transmission intervals 302; rather, it is sufficient if the terminal 130-1 receives the UL pilot signals in a subset of the sequence of transmission intervals 302. E.g., it is possible that the transmission intervals 302 of the subset—at which the terminal 130-1 receives UL pilot signals—are scheduled between the terminal 130-1 and the eNB 112.

Figure 10B:
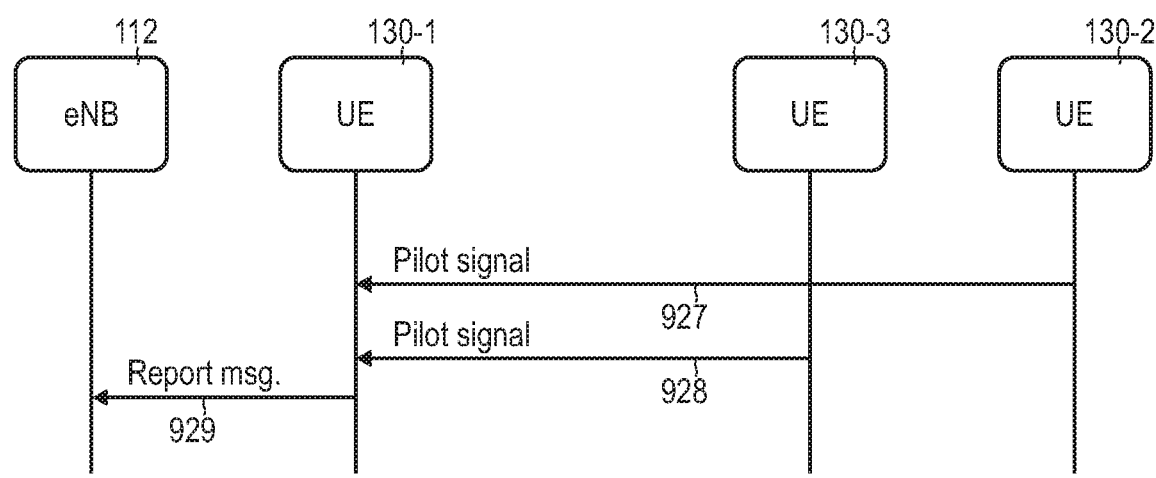
FIG. 10B is a signaling diagram illustrating a first terminal receiving a plurality of uplink pilot signals transmitted by a plurality of second terminals and further illustrating the first terminal transmitting an uplink report message indicative of a property of the received plurality of uplink pilot signals according to various embodiments.

FIG. 10B illustrates aspects with respect to the terminal 130-1 receiving the UL pilot signals 927, 928 transmitted by the terminals 130-2, 130-3. FIG. 10B generally corresponds to FIGS. 8A and 8B; however, the terminal 130-1 receives and aggregates information on UL pilot signals 927, 928 transmitted by two terminals 130-2, 130-3. The UL pilot signals 927, 928 may or may not be intended for one and the same eNB 112 and may or may not be received by the eNB 112. The report message 929 is indicative of a properties of both pilot signals 927, 928.

Figure 11A:
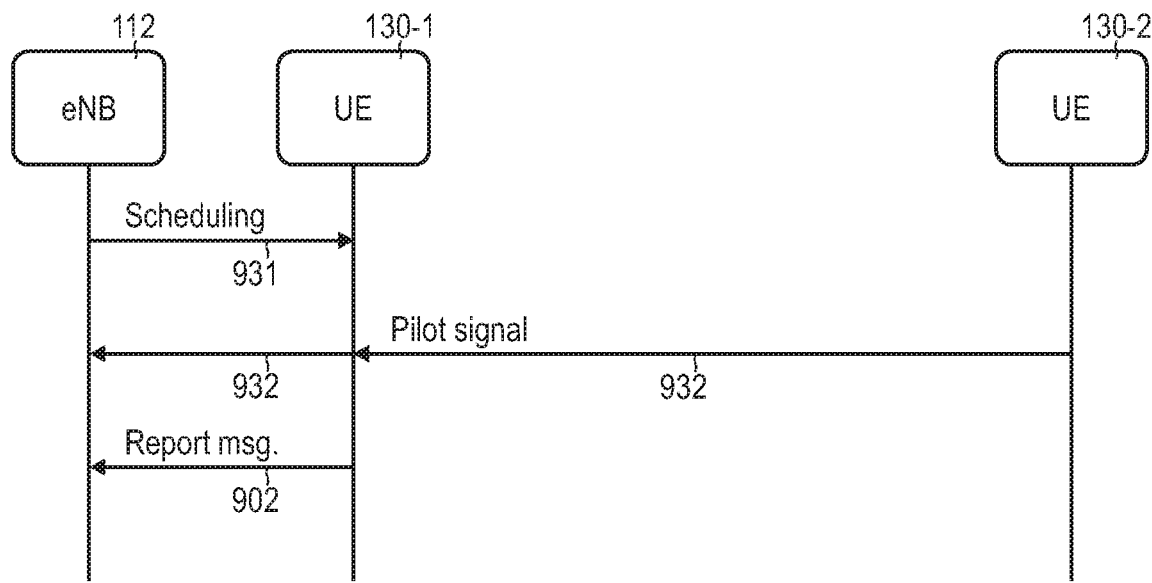
FIG. 11A is a signaling diagram illustrating a first terminal receiving an uplink pilot signal transmitted by a second terminal, the first terminal transmitting an uplink report message indicative of a property of the received uplink pilot signal, and further illustrating sporadically scheduling a respective transmission interval including the uplink pilot signal according to various embodiments.

FIG. 11A illustrates aspects with respect to the terminal 130-1 receiving an UL pilot signal. FIG. 11A further illustrates aspects of sporadically scheduling the transmission intervals 302 of the subset between the eNB 112 and the terminal 130-1. A scheduling control message 931 is transmitted by the eNB 112 and received by the terminal 130-1. The scheduling control message 931 is indicative of resource identification information/timing of the UL pilot signal 932 subsequently transmitted by the terminal 130-2. The scheduling control message 931 prompts the terminal 130-1 to receive the UL pilot signal 932. In response to receiving the scheduling control message 931, the terminal 130-1 receives the UL pilot signal 932.

By employing such sporadic scheduling, the terminal 130-1 is released from the need of activating receiver circuitry blindly, i.e., without knowledge of the timing of UL pilot signals transmitted by the terminal 130-2. Energy consumption can be reduced.

Figure 11B:
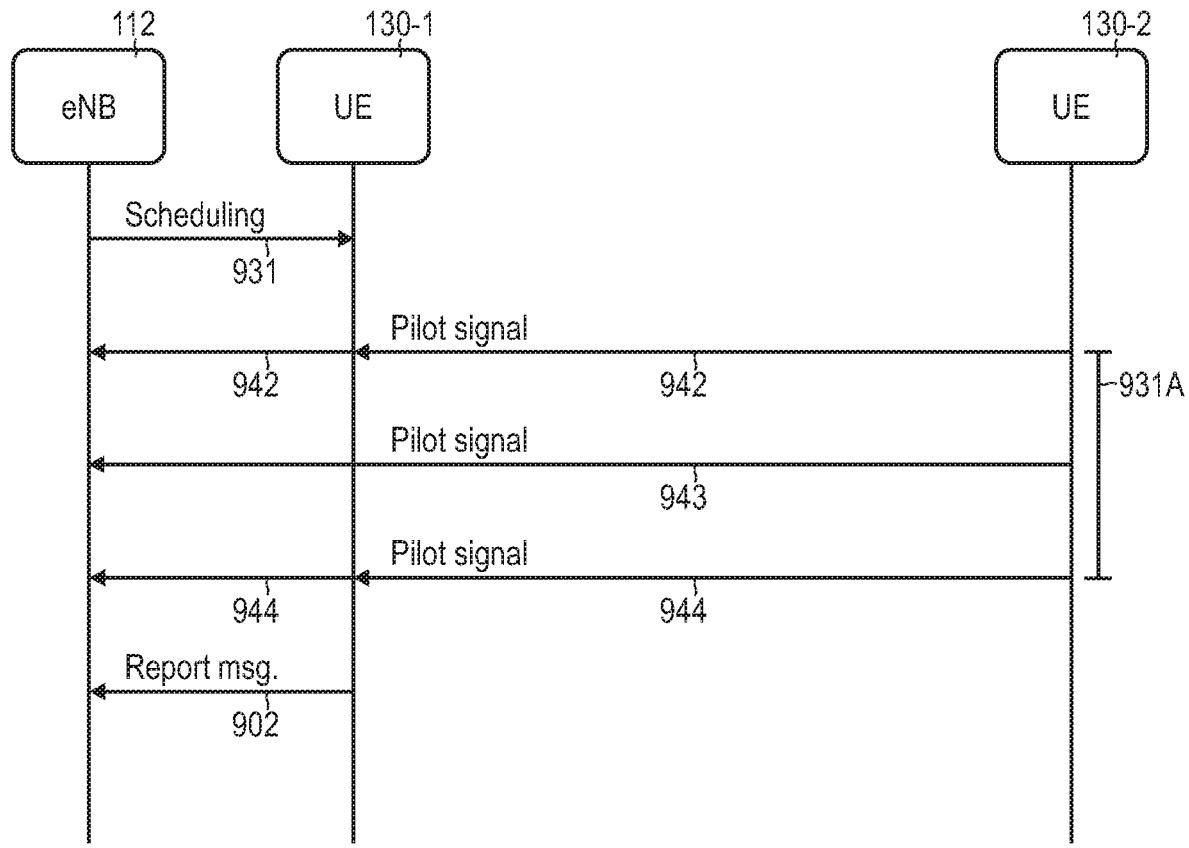
FIG. 11B is a signaling diagram illustrating a first terminal receiving an uplink pilot signal transmitted by a second terminal, the first terminal transmitting an uplink report message indicative of a property of the received uplink pilot signal, and further illustrating persistently scheduling a respective transmission interval including the uplink pilot signal according to various embodiments.

FIG. 11B illustrates aspects with respect to the terminal 130-1 receiving a plurality of UL pilot signals 942, 944. FIG. 11B further illustrates aspects of persistently scheduling the transmission intervals 302 of the subset between the eNB 112 and the terminal 130-1. In the example of FIG. 11B, the scheduling control message 931 specifies reoccurring points in time at which the terminal 130-1 persistently receives UL pilot signals 942, 944 transmitted by the terminal 130-2. E.g., such reoccurring points in time may be defined with respect to certain periodicity 931A.

As can be seen from FIG. 11B, the UL pilot signals 942, 944 are part of transmission intervals 302 of a corresponding subset; on the other hand, the UL pilot signal 943 is not received by the terminal 130-1, because the corresponding transmission interval 302 is not part of the subset. The report message 902 includes the property of the received UL pilot signals 942, 944.

Such scenarios according to the examples of FIGS. 11A, 11B of scheduling the transmission intervals 302 of the subset between the terminal 130-1 and the eNB 112 may be in particularly useful where the terminal 130-2, from time to time, temporarily increases the transmit power of the UL pilot signals. Then, it can be ensured that the terminal 130-1 activates the receiver circuitry of the interface to be able to receive power-boosted UL pilot signals. Similar considerations apply if the eNB 112, from time to time, transmits power-boosted DL pilot signals.

Figure 12:
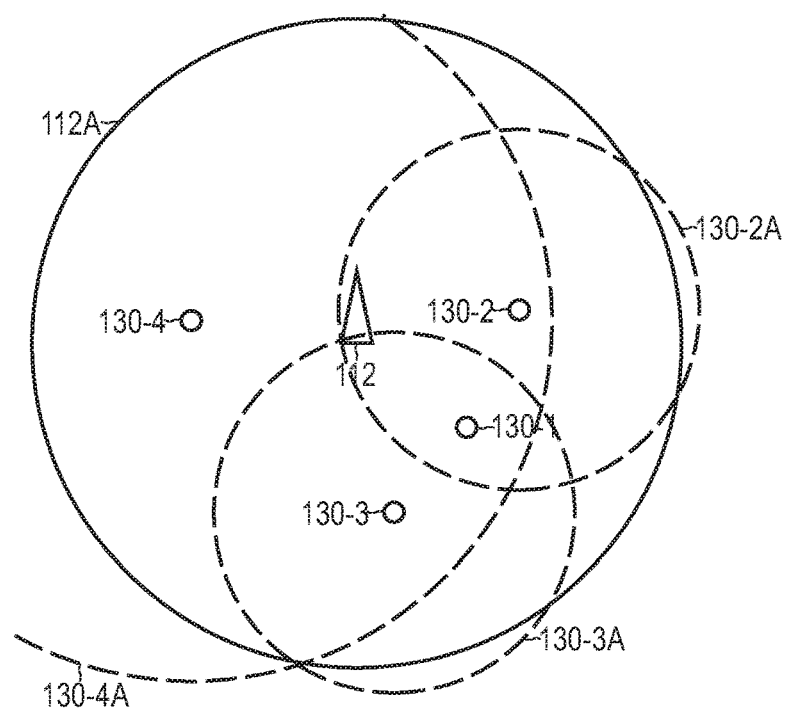
FIG. 12 schematically illustrates communicating power-boosted pilot signals according to various embodiments.

FIG. 12 illustrates aspects with respect to increasing the transmit power of the UL pilot signals. FIG. 12 generally corresponds to FIG. 7. However, from a comparison of FIGS. 7 and 12, it is apparent that the range 130-4A of the UL pilot signals transmitted by the terminal 130-4 is increased for the scenario of FIG. 12. This is because the terminal 130-4 transmits UL pilot signals at a higher transmit power for the scenario of FIG. 12. In order to avoid increased interference due to power-boosted transmission of UL pilot signals, a time-limited, temporary increase of the transmit power is possible.

Such a temporary boosting of the transmit power is conceivable not only for UL pilot signals in scenarios described above, but generally for all types of UL pilot signals including UL pilot signals, DL pilot signals, sidelink pilot signals, cell-specific pilot signals, and terminal-specific pilot signals. Then, additional nodes or devices may receive the power-boosted pilot signals; the power-boosted pilot signals may have beacon functionality.

Figure 13A:
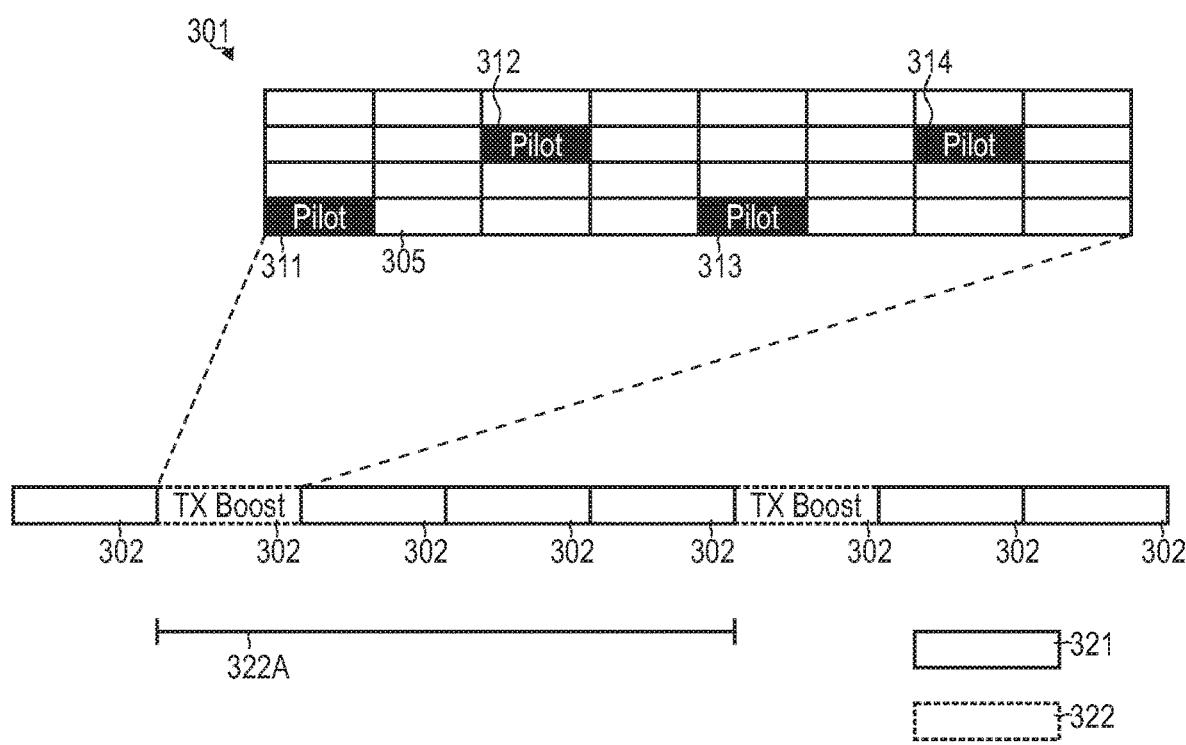
FIG. 13A schematically illustrates communicating, in a first subset of a sequence of transmission intervals, pilot signals having a first transmit power and communicating, in a second subset of the sequence of transmission intervals, communicating the pilot signals having a second transmit power which is larger than the first transmit power according to various embodiments.

FIG. 13A illustrates aspects with respect to transmitting pilot signals 311-314 in a first subset 321 of transmission intervals 302 at the non-zero first transmit power; and transmitting UL pilot signals 311-314 in the second subset 322 of the transmission intervals 302 at a non-zero second transmit power which is larger than the first transmit power. By employing, both, the first and second transmit power, the tradeoff between interference (due to the larger second transmit power) and inaccuracies of channel sensing (due to fewer nodes receiving the pilot signals having the lower first transmit power) can be optimized. Increased coverage is traded against the added interference.

In the example of FIG. 13A, thus, the transmit power of pilot signals 311-314 of the same type is temporarily adjusted. A temporary transmit power boost is implemented for the pilot signals 311-314 of a given type. The pilot signals 311-314 are all of the same type, because the same repetitive resource mapping 301 is used. The various pilot signals 311-314 transmitted at the first transmit power the second transmit power also belong to the same sequence which is associated with a single sequence sequence generator, sometimes also referred to as generator code. E.g., examples of sequence generators are given by 3GPP TS 36.211 V13.0.0 (2015-12); e.g., for the CRS, the sequence generation is specified by chapter 6.10.1.1; e.g., for the SRS, the sequence generation is specified in chapter 5.5.3.1.

From FIG. 13A it is apparent that the transmission intervals 302 of the second subset 322 are arranged in-between the transmission intervals 302 of the first subset 321. In the example of FIG. 13A, the first subset 331 and the second subset 322 are interleaved in time domain. Hence, the first subset 331 and the second subset 332 are alternatingly active within an arbitrary time period. Such an interleaving in time domain may be applicable to the various examples discussed herein.

Generally, the first subset 331 and the second subset 332 could be at least partly different from each other, e.g., with respect to at least one of the following: time domain, frequency domain, code domain, and/or spatial domain. Alternatively or additionally, different duplexing techniques and/or interleaving techniques can be combined with respect to each other. In general, the first subset 331 and the second subset 332 may be in some manner distinguishable from each other. E.g., the first and second subsets 331, 332 may be distinguishable from each other using either time, frequency or spatial means, or combinations thereof. Code division is also a possibility.

From FIG. 13A it is apparent that transmission intervals 302 of the second subset 322 are reoccurring, e.g., at a periodicity 322A. To avoid excessive interference due to a large number of power-boosted pilot signals 311-314, it can be desirable to limit the number of transmission intervals 302 of the second subset 302. E.g., the size—i.e., the number of transmission intervals 302 included in—the first subset 321 may be larger than the size of the second subset 322 at least by a factor of 2, preferably by at least a factor of 100, more preferably by at least a factor of 1000 (in the example of FIG. 13A, the size of the first subset 321 is larger than the size of the second subset 322 by a factor of 3).

It is not germane that all pilot signals 311-314 within a transmission interval 302 of the second subset 321 are transmitted at the second transmit power. Generally, it is sufficient if a single one or a fraction of all pilot signals 311-314 within a given transmission interval 302 of the second subset 321 are transmitted at the second transmit power, while the remaining pilot signals 311-314 are transmitted at the first transmit power. In some examples, it is, however, possible, that all pilot signals 311-314 within a transmission interval 302 of the second subset 321 are transmitted at the second transmit power.

Figure 13B:
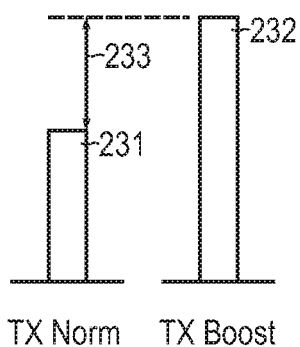
FIG. 13B schematically illustrates the first transmit power and the second transmit power and further illustrates a factor by which the second transmit power is larger than the first transmit power according to various embodiments.

FIG. 13B illustrates aspects with respect to the first transmit power 231 and the second transmit power 232 associated with the first subset 321 and the second subset 322, respectively. From FIG. 13B it is apparent that the second transmit power 232 is larger than the first transmit power 231 by a factor 233. E.g., this factor may amount to at least 1 dB, preferably to at least 3 dB, more preferably to at least 10 dB. E.g., the second transmit power 232 may be determined to equal a maximum transmit power supported by a respective interface or analogue transmitter stage of the transmitting device. Beyond this, further or other considerations may be taken into account when determining the factor 233; examples include: and at least partly random process and/or an optimization process. E.g., optimization may occur with respect to elements selected from the group comprising: interference; an accuracy of channel sensing; the tradeoff between interference and coverage; etc. Beyond such examples, further or other considerations can be taken into account when determining the factor 233. Examples include: a position of the terminal communicating the pilot signals; and a handover of the terminal communicating the pilot signals.

Figure 14:
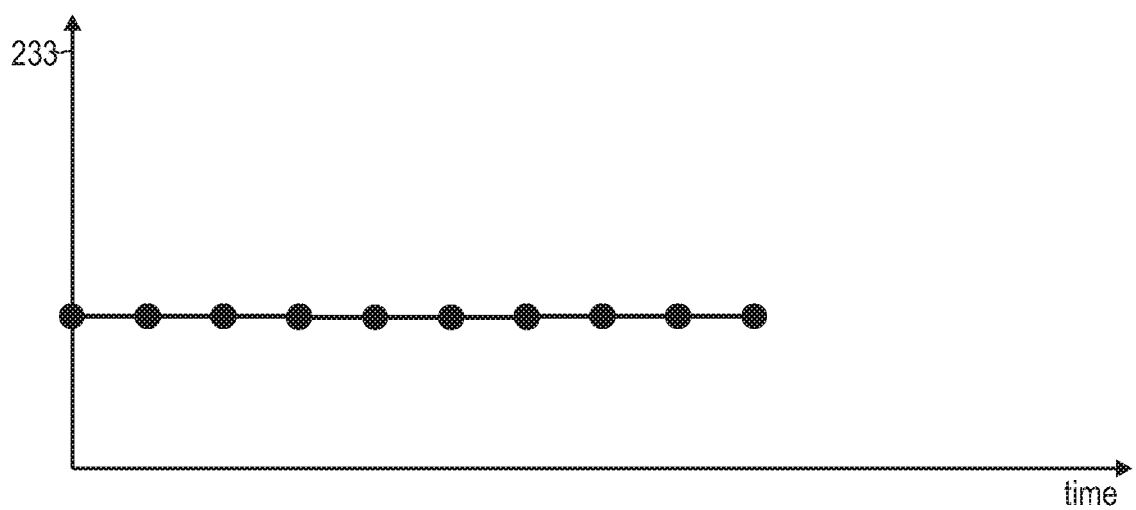
FIG. 14 schematically illustrates a time dependency of the factor by which the second transmit power is larger than the first transmit power according to various embodiments.

FIG. 14 illustrates aspects with respect to determining the factor 233 between the second transmit power 232 and the first transmit power 231. In the example of FIG. 14, the factor 233 is constant over time at a finite, i.e., non-zero, value.

Figure 15:
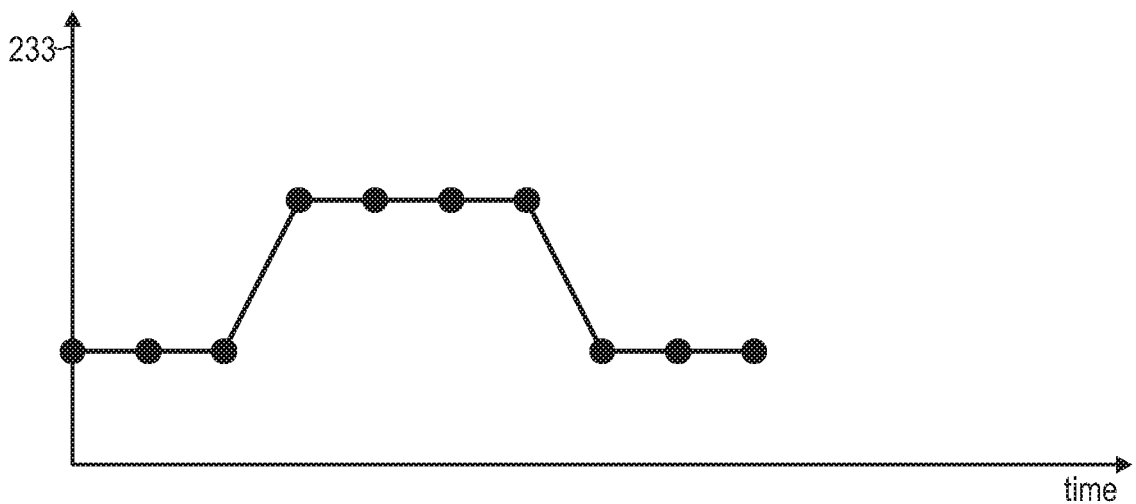
FIG. 15 schematically illustrates a time dependency of the factor by which the second transmit power is larger than the first transmit power according to various embodiments.

FIG. 15 illustrates aspects with respect to determining the factor 233 between the second transmit power 232 and the first transmit power 231. In the example of FIG. 15, the factor 233 varies over the course of time. This may be, e.g., due to random contributions to the determining of the factor 233; a mobility/time-varying position of the terminal communicating the pilot signals; and a handover of the terminal occurring at a certain point in time. Thus, the time-dependency of the factor 233 may be context-dependent.

Figure 16:
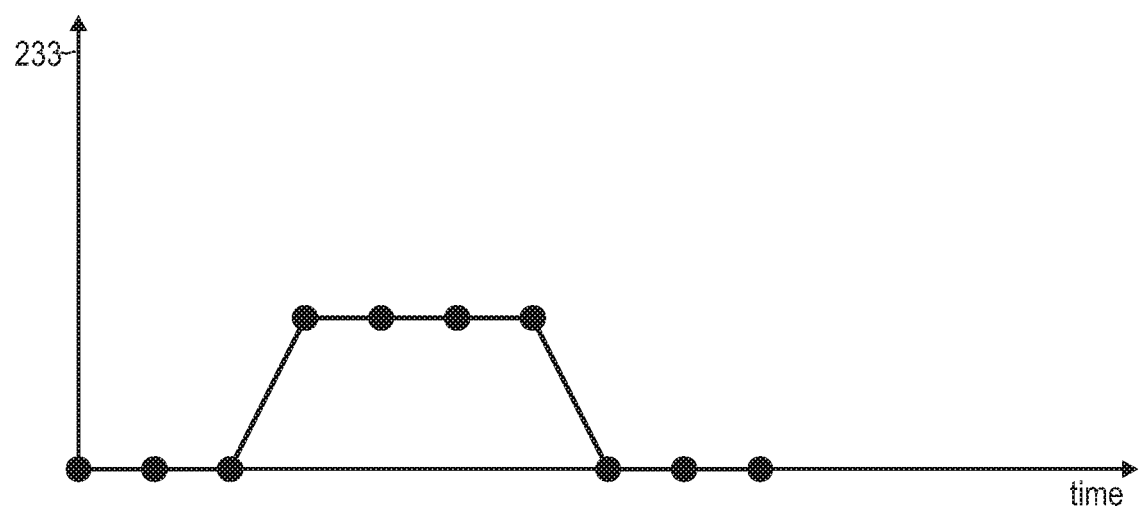
FIG. 16 schematically illustrates a time dependency of the factor by which the second transmit power is larger than the first transmit power according to various embodiments.

FIG. 16 illustrates aspects with respect to determining the factor 233 between the second transmit power 232 and the first transmit power 231. In the example of FIG. 16, the factor 233 varies over the course of time. In particular, the factor 233 varies between zero dB and a finite value. As can be seen, in various examples power boosting of pilot signals may be selectively executed depending on certain trigger criteria and/or context-dependent. I.e., communicating the pilot signals having the second transmit power may be selectively executed depending on certain trigger criteria and/or context-dependent.

While above various aspects have been explained above with respect to the time-dependency and the determining of the factor 233 between the second transmit power 232 and the first transmit power 231, similar considerations may be readily applied to the time-dependency and the determining of a factor between the size of the second subset 232 and the size of the first subset 231.

Figure 17:
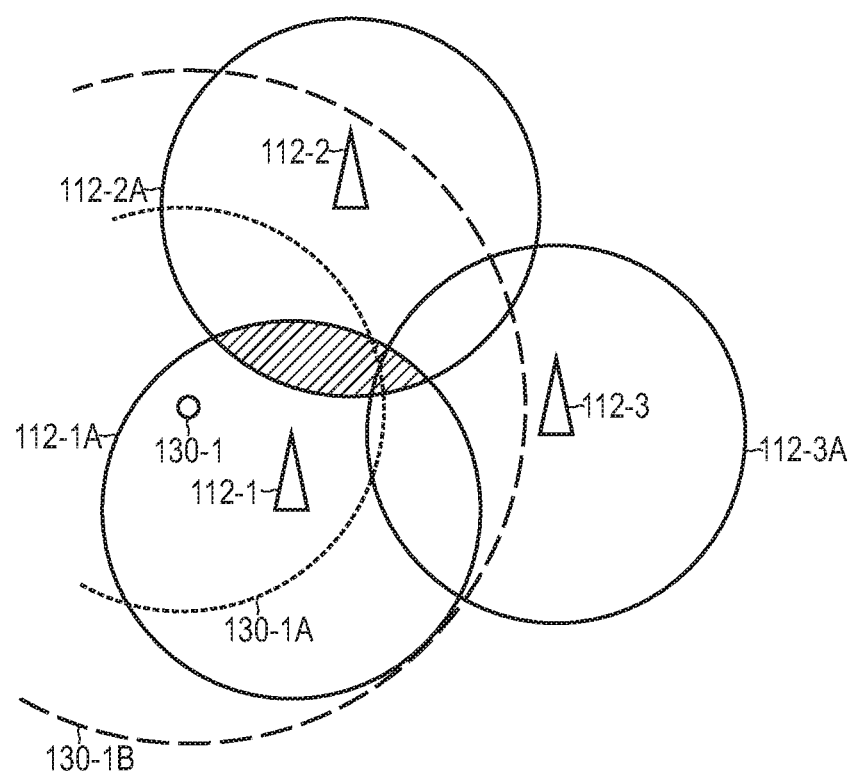
FIG. 17 schematically illustrates a handover scenario according to various embodiments, wherein power-boosted uplink pilot signals are considered for the handover.

FIG. 17 illustrates aspects with respect to handover scenario. FIG. 17 illustrates aspects with respect to a scenario of a terminal 130-1 transmitting UL pilot signals. The terminal 130-1 is attached to the cellular network via the eNB 112-1. In FIG. 17, the terminal 130-1 is located close to the edge of the cell 112-1A of the eNB 112-1. A first range 130-1A associated with the first transmit power 231 is illustrated (dotted line in FIG. 17); furthermore, a second range 130-1B associated with a second transmit power 232 is illustrated (dashed line in FIG. 17). It is apparent that only the pilot signals having the second transmit power 232 can be received by, both, the eNB 112-1, as well as the eNB 112-2 associated with the cell 112-2A (the eNB 112-3 cannot receive any UL pilot signals transmitted by the terminal 130-1). Channel sensing by the eNB 112-2 can thus be facilitated by using the pilot signals having the second transmit power 232. Further, by employing the second transmit power 232 for the UL pilot signals in the transmission intervals 302 of the second subset 322, the eNB 112-2 can be preemptively notified of the terminal 130-1 approaching the cell 112-2A. This information can be used to reliably perform the handover from the eNB 112-1 to the eNB 112-2.

In some examples, power boosting, i.e., transmitting the pilot signals having the second transmit power 232, may be selectively executed if the terminal 130-1 approaches the edge of the cell 112-1A; i.e., it is possible to consider the position of the terminal 130-1 when determining the factor 233 between the second transmit power 232 and the first transmit power 231 (cf. FIG. 16).

In some examples, it can be desirable to schedule, between the eNB 112-1 and the eNB 112-2, the transmission intervals 302 of the second subset 322. This can be done in order to mitigate inter-cell interference caused by the comparably high second transmit power 232. Such scheduling may include control signaling implemented via the core network between the eNB's 112-1, 112-2. Such scheduling may include implementing a common time reference for the eNB's 112-1, 112-2; thus, time synchronization between the eNB's 112-1, 112-2 can be implemented.

In a first example, such scheduling may relate to co-scheduling pilot signals communicated by the eNB 112-1—such as the UL pilot signals transmitted by the terminal 130-1 and received by the eNB 112-1— with signals communicated by the eNB 112-2; i.e., the pilot signals communicated by the eNB 112-1 may be scheduled in resources shared between the eNB 112-1 and the eNB 112-2. In a second example, such scheduling may relate to orthogonally scheduling pilot signals communicated by the eNB 112-1—such as the UL pilot signals transmitted by the terminal 130-1 and received by the eNB 112-1— with signals communicated by the eNB 112-2; i.e., the pilot signals communicated by the eNB 112-1 may be scheduled in resources 305 dedicated to the eNB 112-1 and not shared with the eNB 112-2. Orthogonality may be achieved by at least one of the following: FDMA, TDMA, and CDMA. E.g., it is possible to selectively use orthogonal resources 305 depending on a position of the terminal 130-1. E.g., the transmission intervals 302 of the second subset 322 can be selectively scheduled in resources 305 shared between the eNB 112-1 and the eNB 112-2 depending on the position of the terminal 130-1 communicating the pilot signals. In one example, orthogonally scheduling can be preferred where the terminal 130-1 is located close to the cell edge bordering to the eNB 112-2 (dashed area in FIG. 17). In such an example, strong inter-cell interference is avoided, because orthogonal resources are employed close to the edge of the cell 112-1A; on the other hand, spectral efficiency is achieved by using shared resources if the terminal 130-1 is positioned away from the edge of the cell 112-1A (i.e., outside the dashed area in FIG. 17).

Figure 18:
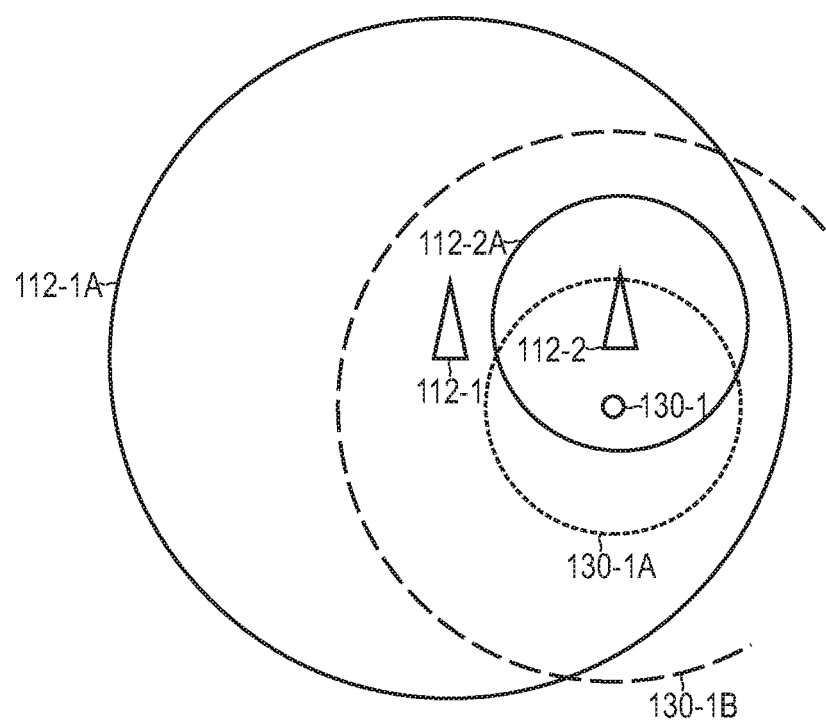
FIG. 18 schematically illustrates a handover scenario according to various embodiments, wherein power-boosted uplink pilot signals are considered for the handover.

FIG. 18 illustrates aspects with respect to a further handover scenario. In the example of FIG. 18, a micro cell 112-2A is implemented by the eNB 112-2. Sometimes, the micro cell is referred to as pico cell. A macro cell 112-1A is implemented by the eNB 112-1. The terminal 130-1 is attached to the cellular network 100 via the eNB 112-2. Because the terminal 130-1 communicates with the eNB 112-2 implementing the micro cell 112-2A, the first transmit power 231 is dimensioned comparably small as can be seen from the small range 130-1A. This is done in order to avoid interference with pilot signals communicated by the eNB 112-1. The second transmit power 232 is dimensioned significantly larger as can be seen from the range 130-1B. In particular, the larger second transmit power 232 facilitates reception of UL pilot signals transmitted by the terminal 130-1 by the eNB 112-1. Based on the received UL pilot signals, the eNB 112-1 can conclude on the channel condition between the terminal 130-1 and the eNB 112-2. In particular, backhaul signaling between the eNB's 112-1, 112-2 can be reduced. Such a reduction of backhaul signaling may be in particularly relevant where unlicensed frequency bands are used for the communication between the terminal 130-1 and the eNB 112-2.

Figure 19:
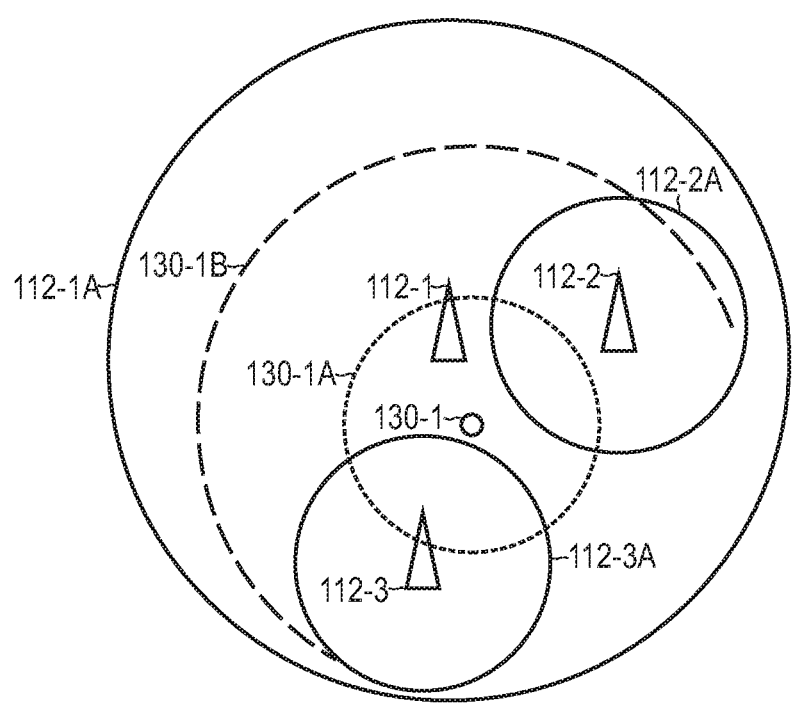
FIG. 19 schematically illustrates a handover scenario according to various embodiments, wherein power-boosted uplink pilot signals are considered for the handover.

FIG. 19 illustrates aspects with respect to a further handover scenario. In the example of FIG. 19, micro cells 112-2A, 112-3A are implemented by the eNB's 112-2, 112-3, respectively. A macro cell 112-1A is implemented by the eNB 112-1. The terminal 130-1 is attached to the cellular network 100 via the eNB 112-1. When the terminal 130-1 approaches one of the micro cells 112-2A, 112-3A, such an approach can be preemptively detected by the respective eNB 112-2, 112-3 directly by means of the pilot signals transmitted at the higher second transmit power 232, see the corresponding range 130-1B. In particular, because the pilot signals transmitted at the second transmit power 232 can be received by both eNB's 112-2, 112-3, it is possible to select the most appropriate micro cell 112-2A, 112-3A. Backhaul signaling between the eNB 112-1 and the eNB 112-2, 112-3 is reduced or avoided.

Figure 20:
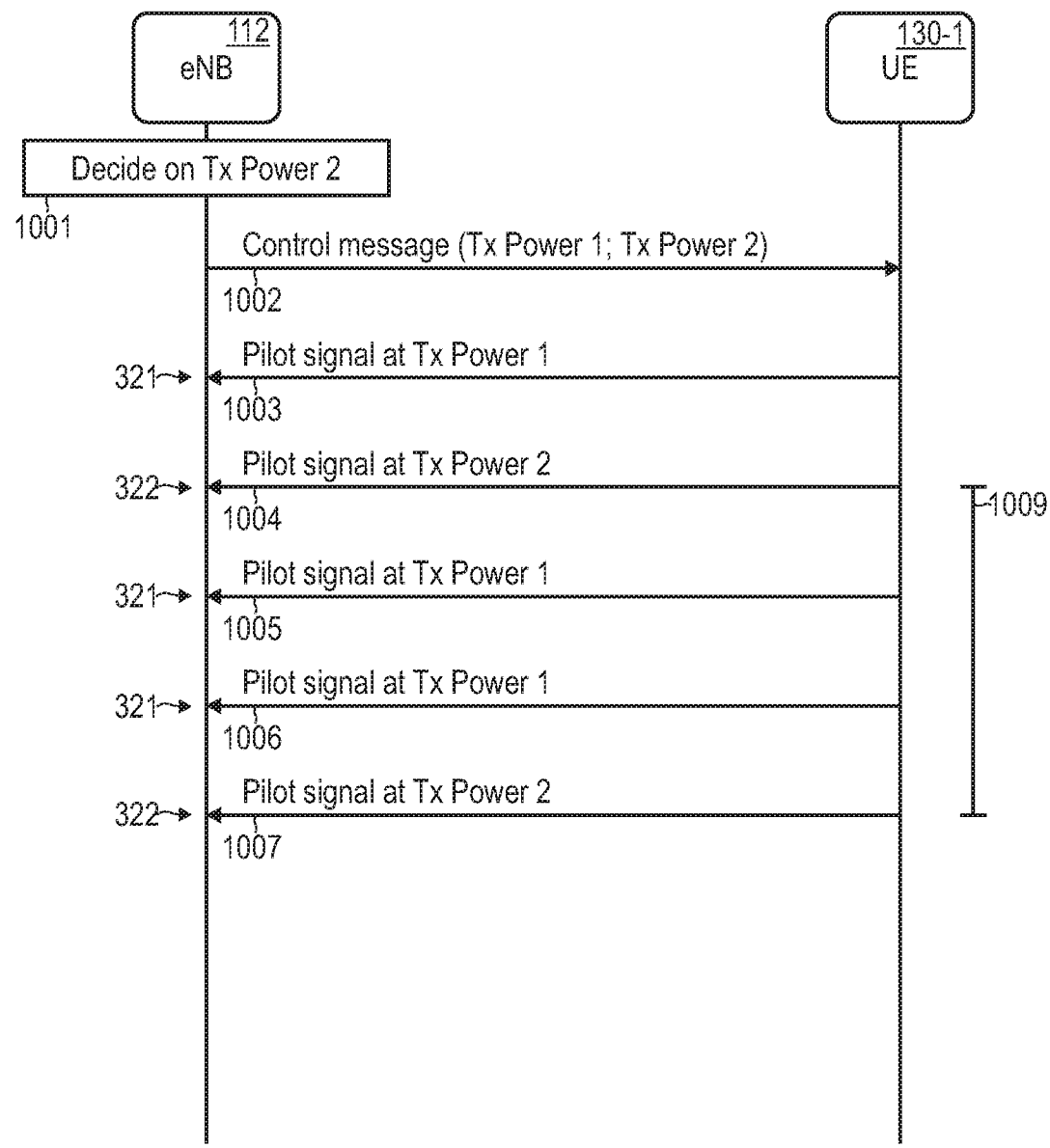
FIG. 20 is a signaling diagram illustrating persistently scheduling transmission intervals of a second subset including the pilot signals having the second transmit power according to various embodiments.

FIG. 20 illustrates aspects with respect to communicating pilot signals having the first transmit power 231 in the first subset 321 and communicating the pilot signals having the second transmit power 232 in the second subset 322. FIG. 20 is a signaling diagram of signaling between the eNB 112 and the terminal 130-1. In the example of FIG. 20, the decision logic on implementing communication of the pilot signals having the second transmit power 232 resides at the eNB 112. In detail, at 1001, the eNB 112 decides to implement communication of the pilot signals having the second transmit power 232.

FIG. 20 further illustrates aspects with respect to scheduling the transmission intervals 302 of the second subset 322 between the eNB 112 and the terminal 130-1. At 1001, a timing 322A of the transmission intervals 302 of the second subset 322 is determined. In the example of FIG. 20, the timing 322A corresponds to reoccurring, e.g., at a given periodicity, transmission intervals 302 of the second subset 322. Non-periodically reoccurring transmission intervals 302 are possible.

Next, a control message 1002 indicative of the second transmit power 232, and optionally indicative of the first transmit power 231, is communicated from the eNB 112 to the terminal 130-1. E.g., the control message 1002 can be a RRC control message. The control message 1002 is also indicative of the timing 322A. Based on the control message 1002, the transmission intervals 302 of the second subset 322 are persistently scheduled, e.g., scheduled until a new control message 1002 is communicated from the eNB 112 to the terminal 130-1

Then, the terminal 130-1 transmits UL pilot signals 1003-1007. The second subset 322 is interleaved into the first subset 321; in detail, the pilot signals 1004 having the second transmit power 232 is transmitted in-between the pilot signals 1003, 1005 having the first transmit power 231. However, such time-domain interleaving is an option only. In other examples, other ways of distinguishing the first and second subsets 321, 322 may be chosen; e.g., the first and second subsets 321, 322 may be distinguished from each other with respect to at least one of the following: in frequency domain, spatial domain, code domain, etc. . . .

Figure 21:
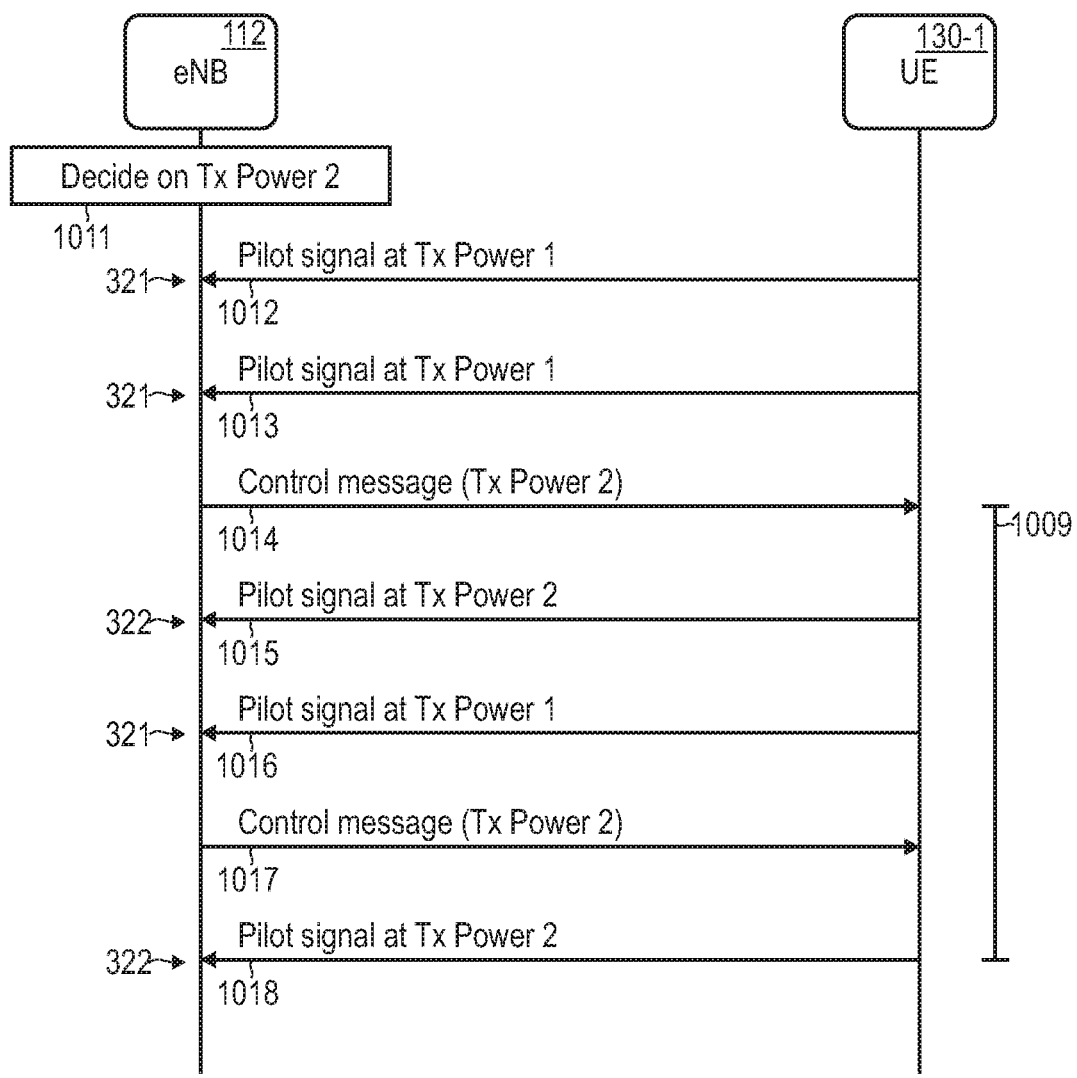
FIG. 21 is a signaling diagram illustrating sporadically scheduling transmission intervals of a second subset including the pilot signals having the second transmit power according to various embodiments.

FIG. 21 illustrates aspects with respect to communicating pilot signals having the first transmit power 231 in the first subset 321 and communicating the pilot signals having the second transmit power 232 and the second subset 322. The example of FIG. 21 generally corresponds to the example of FIG. 20. In the example of FIG. 21, the transmission intervals 302 of the second subset 322 are sporadically scheduled. In particular, at 1001, the timing 322A is determined. Also in the example of FIG. 20, the timing 322A corresponds to reoccurring, e.g., at a given periodicity, transmission intervals 302 of the second subset 322. However, in the scenario of FIG. 21, dedicated control messages 1014, 1017 are communicated from the eNB 112 to the terminal 130-1, each one of the dedicated control messages 1014, 1017 triggering transmission of a single UL pilot signal 1015, 1018. Hence, the transmission intervals 302 of the second subset 322 are sporadically scheduled. It is not required that the terminal 130-1 is informed on the timing 322A, because each control message 1014, 1017 individually triggers transmission of a respective UL pilot signal 1015, 1018 having the second transmit power 232.

In the scenarios of FIGS. 20 and 21, the decision logic for deciding on using the higher, second transmit power 232 resides at the eNB 112. Likewise, the second transmit power 232 is determined at the eNB 112. The eNB 112 is also informed on the timing 322A with which the transmission intervals 302 of the second subset 322 are scheduled. Thus, the eNB 112 can perform accurate channel sensing based on the well-defined parameters of the UL pilot signals transmitted in the second subset 322 at the second transmit power 232.

In some scenarios, it is also possible that the decision logic for deciding on using the higher, second transmit power 232 at least partly resides at the terminal 130-1. Here, the terminal 130-1 may decide on the timing 322A of the transmission intervals 302 of the second subset 322 and/or on the second transmit power 232. Such scenarios may be applicable where control signaling is limited, e.g., due to the usage of unlicensed bands and/or different involved operators. Here, bottom-up scheduling, autonomously executed by individual terminals or other nodes may be of relevance.

Figure 22:
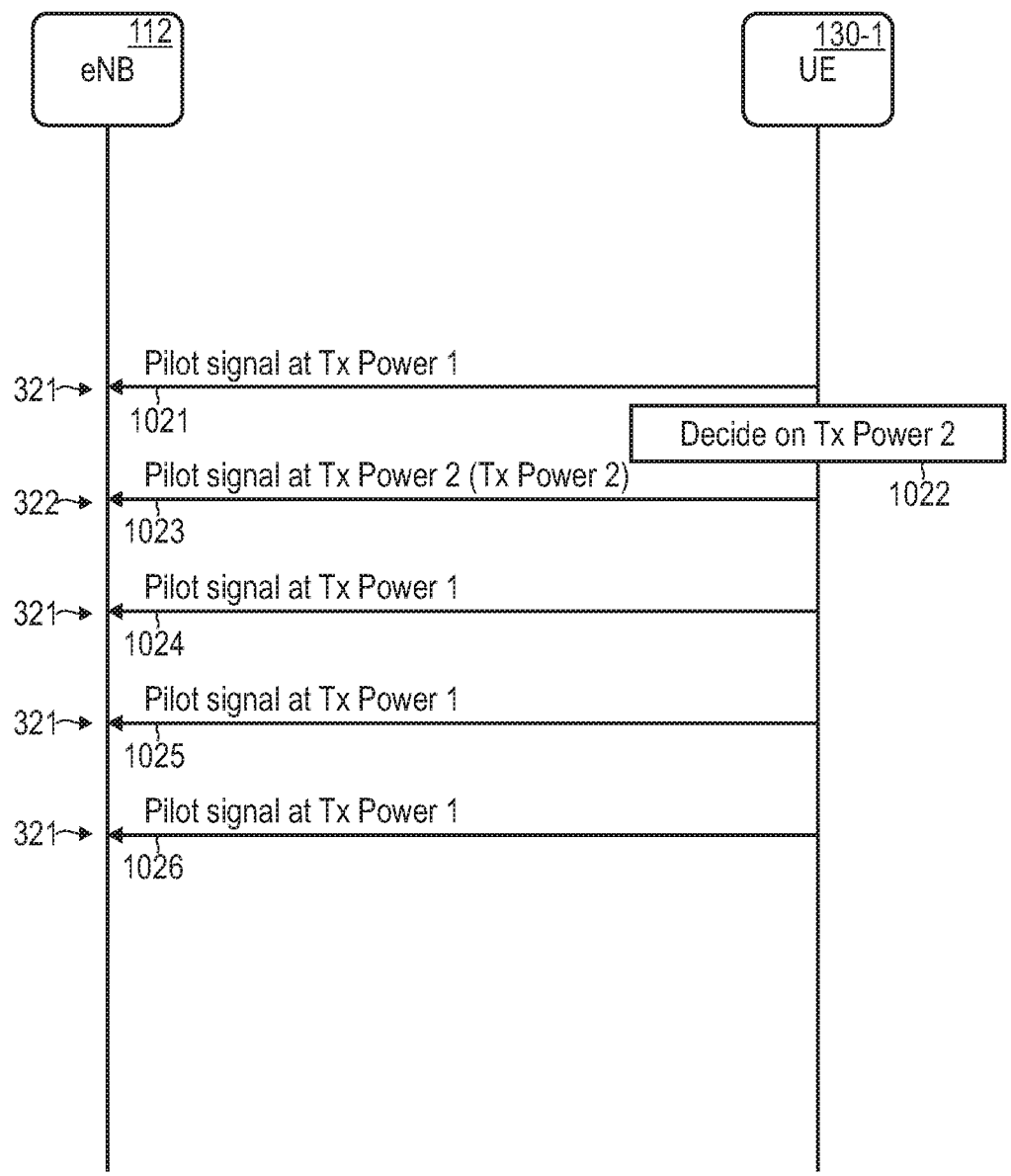
FIG. 22 is a signaling diagram illustrating communicating a pilot signal in a transmission interval of a second subset and having a second transmit power, wherein the pilot signal is indicative of the second transmit power according to various embodiments.

FIG. 22 illustrates aspects with respect to communicating pilot signals 1021, 1024-1026 having the first transmit power 231 in the first subset 321 and communicating the pilot signals 1023 having the second transmit power 232 in the second subset 322. In the example of FIG. 22, the decision logic for deciding on using the higher second transmit power 232 resides at the terminal 130-1.

In the example of FIG. 22, the terminal 130-1 transmits UL pilot signals 1021, 1024-1026 in the first subset 321 and at the first transmit power; the terminal 130-1 transmits the UL pilot signals 1023 at the higher, second transmit power 232. The UL pilot signal 1023 is indicative of the second transmit power 232 such that the eNB 112 is informed accordingly. The second transmit power 232 is determined at the terminal 130-1. In order to enable accurate channel sensing at the eNB 112, the eNB 112 should be informed on the second transmit power 232.

Different scenarios are conceivable for implementing the pilot signal 1023 to be indicative of the second transmit power 232. E.g., the pilot signal 1023 can be explicitly or implicitly indicative of the second transmit power 232. E.g., the sequence of pilot signals 1021, 1023-1026 may be associated with the same sequence generator. Thus, the same sequence generator may be used for generation of the pilot signals 1021, 1023-1026. In an example, the respective transmit power of each pilot signals 1021, 1023-1026 is an input of the generator code. In particular, there may be a unique mapping between the symbols output by the sequence generator for a given pilot signal 1021, 1023-1026 and the transmit power input to the sequence generator. Thus, based on the particular symbol of a given pilot signal 1021, 1023-1026, it can possible to conclude on the respective transmit power 231, 232; as such, the pilot signal 1023 is implicitly indicative of the second transmit power 232. This reduces the control signaling overhead.

In a further scenario, an explicit flag may be appended to the pilot signal 1023; this flag may be indicative of the second transmit power 232, e.g., according to predefined rules, etc. As such, the pilot signal 1023 is explicitly indicative of the second transmit power 232.

By such techniques it is possible that further terminals receiving the power-boosted pilot signal 1023 (cf. FIGS. 7, 8A, 8B, 9A, 9B, 10, 11) are also aware of the second transmit power 232. A respective UL report message 902 could include an indicator indicative of the second transmit power 232.

Figure 23:
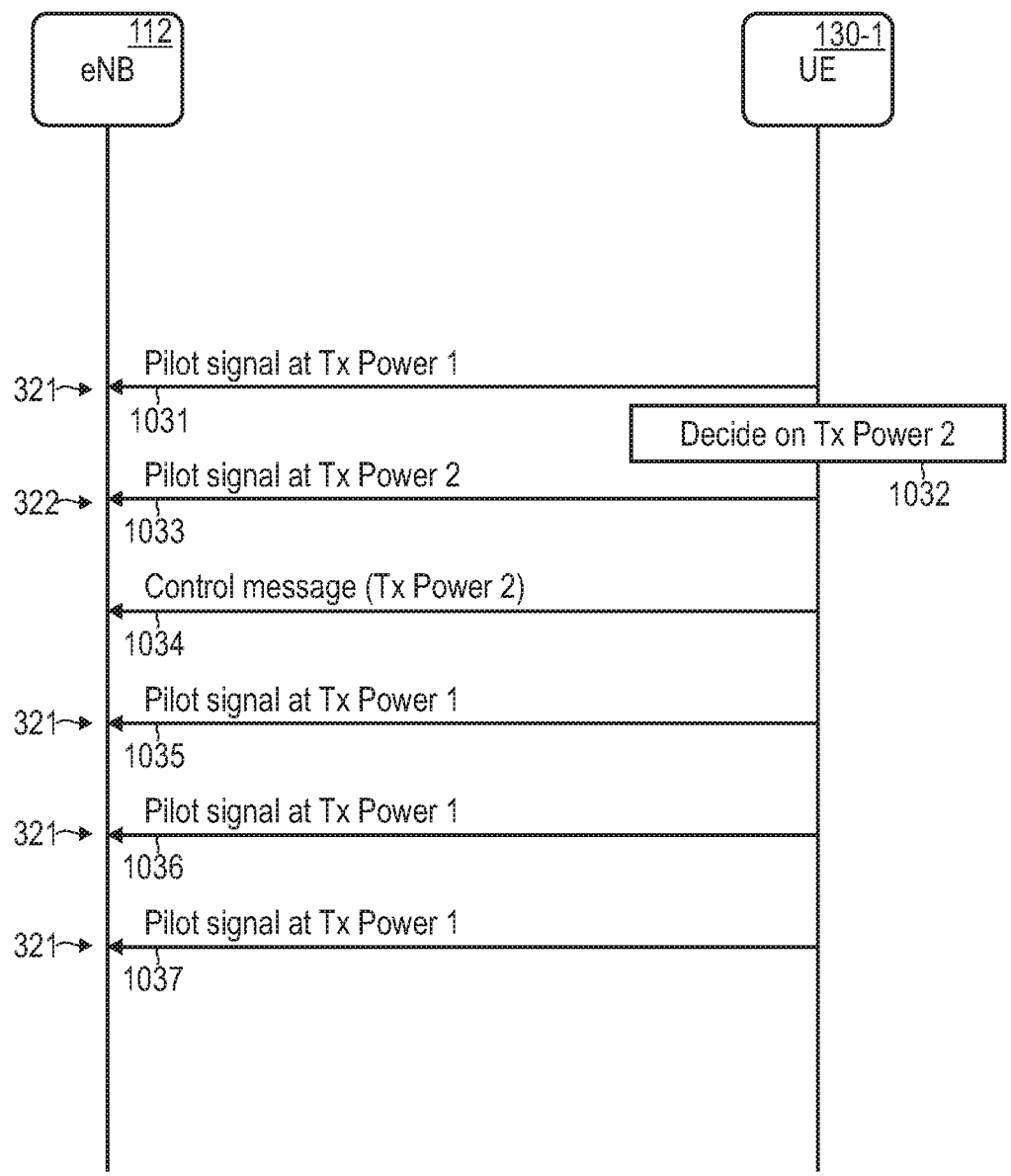
FIG. 23 is a signaling diagram illustrating communicating a pilot signal in a transmission interval of a second subset and having a second transmit power and further illustrating communicating a control message being indicative of the second transmit power according to various embodiments.

FIG. 23 illustrates aspects with respect to communicating pilot signals 10131 1035-1037 having the first transmit power 231 in the first subset 321 and communicating the pilot signals 1033 having the second transmit power 232 in the second subset 322. The example of FIG. 23 generally corresponds to the example of FIG. 22. 1031 corresponds to 1021. 1032 corresponds to 1022. 1033 corresponds to 1023. 1035 corresponds to 1024. 1036 corresponds to 1025. 1037 corresponds to 1026.

The decision logic for deciding on using the higher second transmit power 232 resides at the terminal 130-1. In the example of FIG. 23, instead of implementing the pilot signal 1033 having the second transmit power 232 to be indicative of the second transmit power 232, a dedicated control message 1034 is communicated from the terminal 130-1 to the eNB 112. E.g., the control message 1034 may be a RRC control message or the like. The control message 1034 may be communicated in a temporal context with the pilot signal 1033, e.g., at the same transmission interval 302 or the like. The control message 1034 may include an indicator indicative of the UL pilot signal 1033.

If the control message 1034 is broadcasted to other devices, it is possible that further terminals receiving the power-boosted pilot signal 1023 (cf. FIGS. 7, 8A, 8B, 9A, 9B, 10, 11) are also aware of the second transmit power 232. A respective UL report message 902 could include an indicator indicative of the second transmit power 232.

Figure 24:
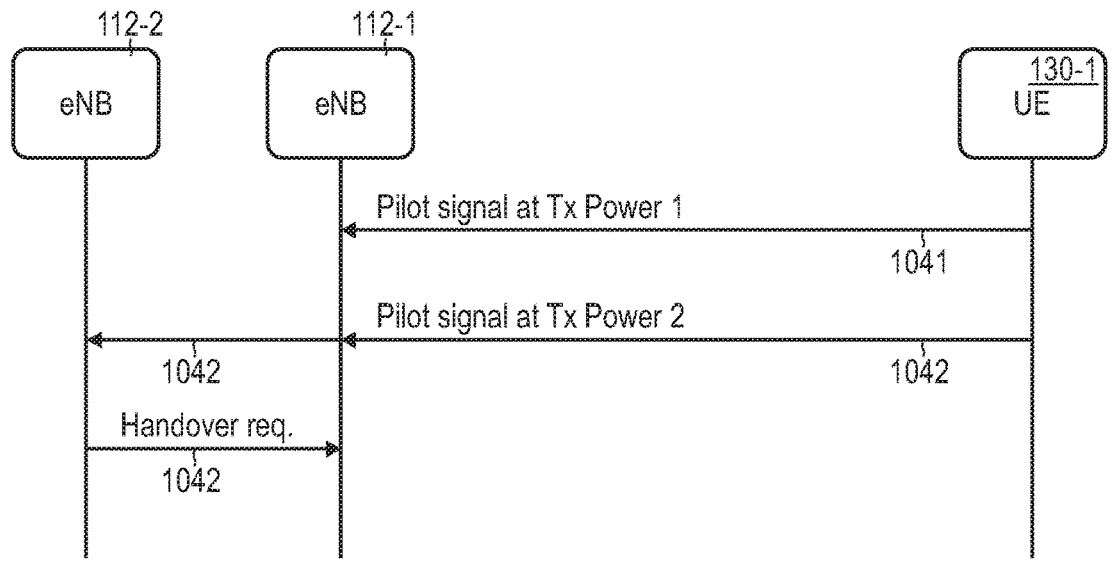
FIG. 24 is a signaling diagram illustrating a handover scenario according to various embodiments.

FIG. 24 illustrates aspects with respect to handover scenario. FIG. 24 is a signaling diagram of communication between the eNB 112-1, the eNB 112-2, and the terminal 130-1. Aspects discussed with respect to FIG. 24 may be employed, e.g., in the scenario of FIGS. 17-19.

In a handover process, it is easier for the eNB 112-2 to be aware of the terminal 130-1 approaching the coverage area if the terminal 130-1 employs power-boosted pilot signals. E.g., in a scenario where the eNB 112-2 only receives power-boosted pilot signals, handover may be avoided, because the coverage area has not been reached. It is also possible to prepare for handover if based on the power-boosted pilot signals it is judged that the terminal 130-1 approaches the coverage area.

In the example of FIG. 24, the terminal 130-1 transmits an UL pilot signal 1041 at the first transmit power 231. The pilot signal 1041 is received by the eNB 112-1 to which the terminal 130-1 is connected and via which the terminal 130-1 is attached to the cellular network 100. The pilot signal 1041 is not received by the eNB 112-2. This is due to the limited first transmit power 231.

The terminal 130-1 then transmits the pilot signal 1042 at the second transmit power 232. Both, the eNB 112-1, as well as the eNB 112-2 receive the pilot signal 1042. This is due to the increased second transmit power 232.

Based on the received pilot signal 1042, the handover can be initiated. In a specific example of FIG. 24, the handover is initiated by the target eNB 112-2 by communicating a handover request 1042 from the target eNB 112-2 to the source eNB 112-1. In other examples, the handover can also be initiated by the source eNB 112-1. The further handover procedure can be implemented according to 3GPP TS 23.401 and 3GPP TS 36.300.

Figure 25:
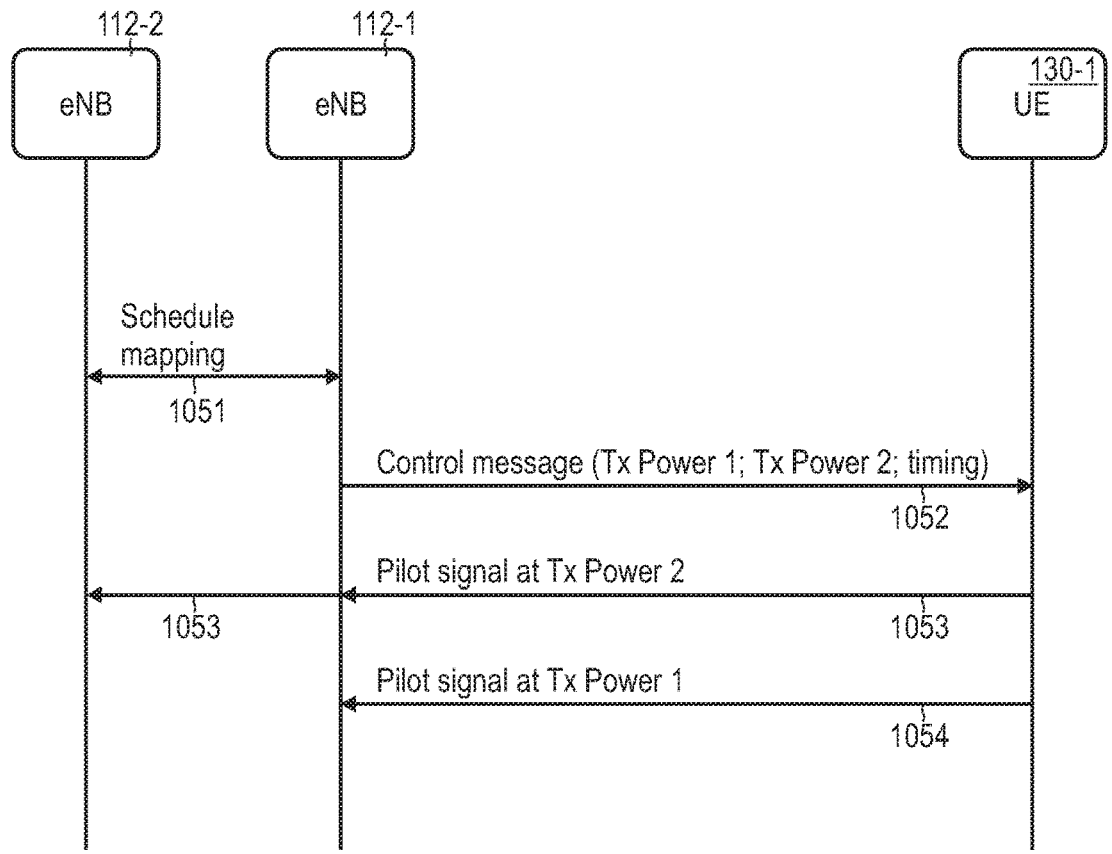
FIG. 25 is a signaling diagram illustrating scheduling, between two access nodes of the cellular network, transmission intervals of a second subset including the pilot signals having a second transmit power larger than a first transmit power according to various embodiments.

FIG. 25 illustrates aspects with respect to a scheduling, between the eNBs 112-1, 112-2, the transmission intervals 302 of the second subset 322. FIG. 25 is a signaling diagram of communication between the eNB 112-1, the eNB 112-2, and the terminal 130-1. Aspects discussed with respect to FIG. 25 may be employed, e.g., in the scenario of FIGS. 17-19.

At least one control message 1051 is communicated between the eNB's 112-1, 112-2. The at least one control message can be indicative of the timing 322A of the transmission intervals 302 of the second subset 322. The timing 322A can be such that inter-cell interference between the cell 112-1A associated with the eNB 112-1 and the cell 112-2A associated with the eNB 112-2 is mitigated.

Next, a control message is communicated from the eNB 112-1 to the terminal 130-1. The control message 1052 is indicative of the timing 322A. Optionally, the control message is indicative of the second transmit power 232 and/or the first transmit power 231. The terminal 130-1 can then transmit the UL pilot signals 1053, 1054 according to the timing 322A and optionally according to the specified first and second transmit power 231, 232.

Figure 26:
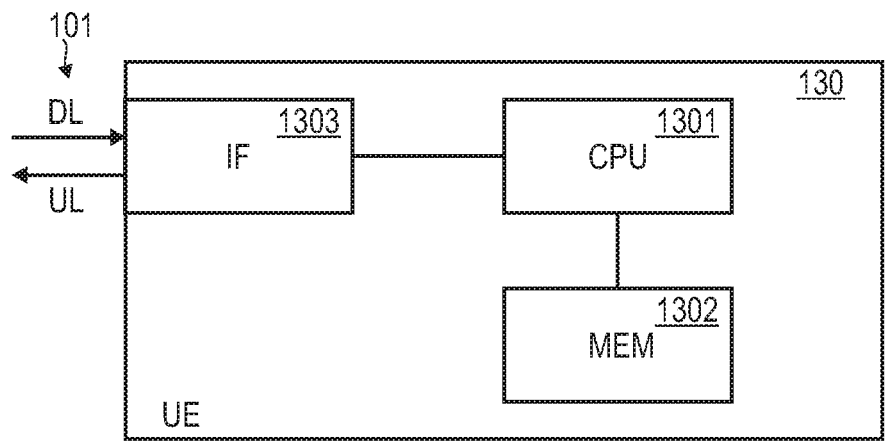
FIG. 26 schematically illustrates a terminal according to various embodiments.

FIG. 26 illustrates schematically a terminal 130 which may be employed in the various examples described herein. The terminal 130 comprises a processor 1301, a memory 1302, e.g., a non-volatile memory, and an interface 1303. The interface 1303 is configured to communicate on the radio link 101. E.g., the interface 1303 may comprise an antenna array in order to employ MIMO or MAMI techniques. The processor 1301 is configured to retrieve control data from the memory 1302. Executing the control data causes the processor 1302 to perform techniques as described herein, e.g., relating to: receiving UL pilot signals transmitted by a further terminal; scheduling transmission intervals of a subset in which UL pilot signals are received; determining a property of the received UL pilot signal; transmitting an UL report message indicative of the property of the received UL pilot signal; communicating pilot signals having time-varying transmit power; communicating pilot signals which are indicative of the transmit power; communicating a control message indicative of the transmit power of a pilot signals; scheduling transmission intervals during which pilot signals of a certain transmit power are communicated; and/or determining a resource mapping and/or a transmit power of pilot signals; etc.

Figure 27:
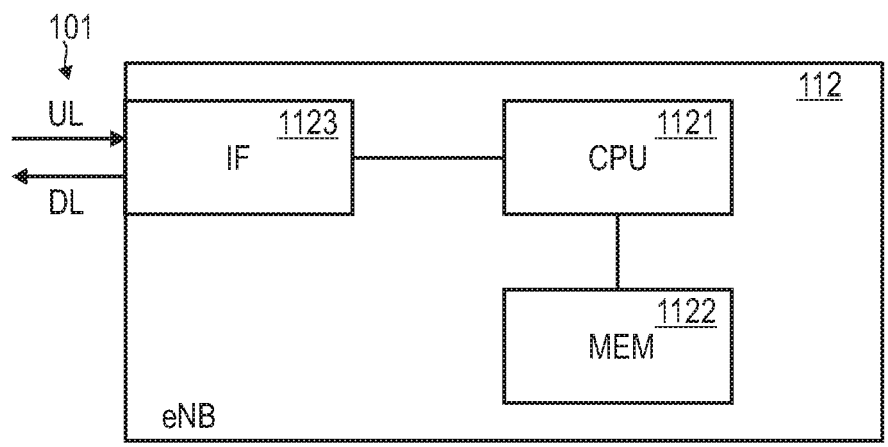
FIG. 27 schematically illustrates an access node according to various embodiments.

FIG. 27 illustrates schematically and eNB 112 which may be employed in the various examples described herein. The eNB 112 comprises a processor 1121, a memory 1122, e.g., a non-volatile memory, and an interface 1123. The interface 1123 is configured to communicate on the radio link 101. E.g., the interface 1123 may comprise an antenna array in order to employ MIMO or MAMI techniques. The processor 1121 is configured to retrieve control data from the memory 1122. Executing the control data causes the processor 1121 to perform techniques as described herein, e.g., relating to: receiving UL pilot signals; scheduling transmission intervals of a subset in which UL pilot signals are to be received by a terminal; determining a property of the received UL pilot signal; determining a property of the received UL pilot signals; transmitting an UL report message indicative of the property of the received UL pilot signals; communicating pilot signals having time-varying transmit power; communicating pilot signals which are indicative of the transmit power; communicating a control message indicative of the transmit power of pilot signal; scheduling transmission intervals during which pilot signals of a certain transmit power are communicated; performing link adaptation; performing channel sensing; and/or determining a resource mapping and/or a transmit power of pilot signals; etc.

Figure 28:
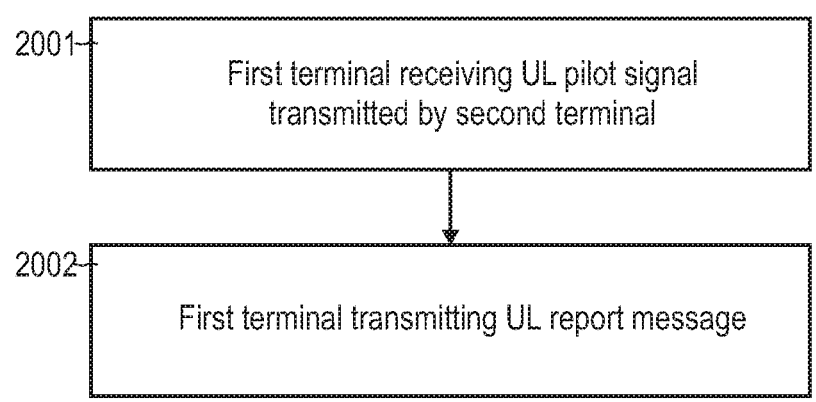
FIG. 28 schematically illustrates a method according to various embodiments.

FIG. 28 is a flowchart of a method according to various embodiments. E.g., the method according to FIG. 28 may be executed by the terminal according to FIG. 26.

At 2001, a first terminal 130, 130-1-130-4 receives at least one UL pilot signal 310-318 transmitted by a different, second terminal 130, 130-1-130-4. E.g., 2001 may be executed during silent periods 307 at which the first terminal 130, 130-1-130-4 does not transmit pilot signals 310-318. E.g., 2001 may be continuously or intermittedly executed by the first terminal 130, 130-1-130-4. E.g., 2001 may be triggered by a certain event. E.g., 2001 may be triggered by a respective transmission interval 302 which has been identified by scheduling; said scheduling may be between an eNB 112, 112-1-112-3 and the first terminal 130, 130-1-130-4.

E.g., the UL pilot signal 310-310 received at 2001 may be selected from the group comprising: demodulation reference signal (DRS) according to 3GPP TS 36.211 V13.0.0 (2015-12) chapter 5.5.2; and sounding reference signal (SRS) according to 3GPP TS 36.211 V13.0.0 (2015-12) chapter 5.5.3.

At 2002, the first terminal 130, 130-1-130-4 transmits an UL report message 902. The UL report message 902 is indicative of a property of the received at least one UL pilot signal 310-318.

The property may be indicative of information directly relevant for channel sensing including, e.g.: a phase of the received UL pilot signal 310-318; an amplitude of the received UL pilot signal 310-318; a time offset of the received UL pilot signal 310-318; etc. Alternatively or additionally, the property may be indicative of information which enables the eNB 112, 112-1-112-3 receiving the UL report message 902 to conclude on the originator of the UL pilot signal 310-318, i.e., on the identity of the second terminal 130, 130-1-130-4. Such a property may be selected from the group comprising: an identity of the second terminal 130, 130-1-130-4; a resource 305 of the at least one UL pilot signal 310-318; and resource identification information of the received at least one UL pilot signal 310-318. E.g., based on the resource 305 of the at least one UL pilot signal 310-318 and/or based on the resource identification information, together with the knowledge of the repetitive resource mapping according to which the UL pilot signals 310-318 are transmitted by the terminals connected to an access node, it is possible to conclude on the identity of the second terminal.

If at 2001 a plurality of UL pilot signals 310-318 is received, information regarding the plurality of UL pilot signals 310-318 may be aggregated into the UL report message 902 transmitted at 2002.

Figure 29:
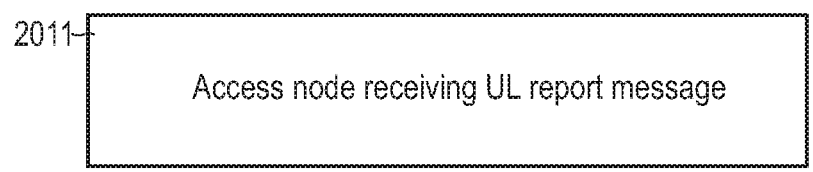
FIG. 29 schematically illustrates a method according to various embodiments.

FIG. 29 is a flowchart of a method according to various embodiments. E.g., the method according to FIG. 29 may be executed by the eNB 112 according to FIG. 27. At 2011, the eNB 112, 112-1-112-3 receives the UL report message 902 from the first terminal 130, 130-1-130-4. The UL report message 902 is indicative of a property of at least one UL pilot signal 310-318 which has been received by the first terminal 130, 130-1-130-4. The UL pilot signal 310-318 has been transmitted by a second terminal 130, 130-1-130-2.It is possible that the eNB 112 also receives the at least one UL pilot signal 310-318 on which the UL report message 902 reports.

Figure 30:
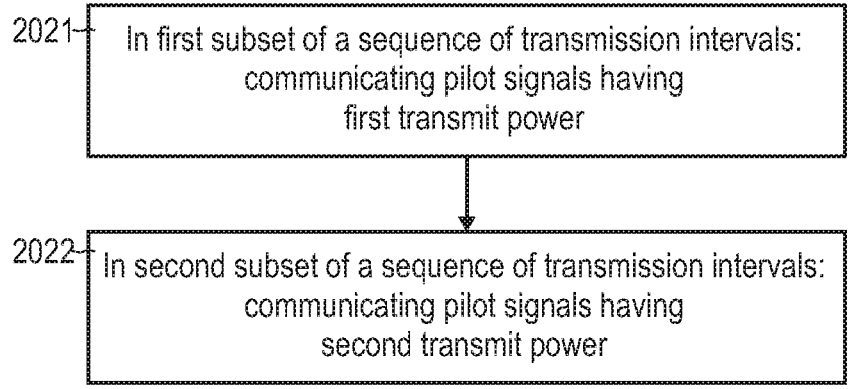
FIG. 30 schematically illustrates a method according to various embodiments.

FIG. 30 is a flowchart of a method according to various embodiments. E.g., the method according to FIG. 30 may be executed by the terminal 130 according to FIG. 26 and/or by the eNB 112 according to FIG. 27. At 2021, pilot signals 310-318 having a first transmit power 231 are transmitted and/or received (communicated). The pilot signals having a first transmit power 231 are included in the first subset 321 of transmission intervals 302.

At 2022, pilot signals 310-318 having a second transmit power 232 are transmitted and/or receiving (communicated). The pilot signals having the second transmit power 232 are included in the second subset 322 of the transmission intervals 303. The first subset 321 and the second subset 322 are interleaved in time domain. However, such time-domain interleaving is an option only. In other examples, other ways of distinguishing the first and second subsets 321, 322 may be chosen; e.g., the first and second subsets 321, 322 may be distinguished from each other with respect to at least one of the following: in frequency domain, spatial domain, code domain, etc.

In the example of FIG. 30, various types of pilot signals 310-318 can be employed for 2021 and 2022. In particular, the sign type of pilot signal can be employed for 2021 and 2022. A type of pilot signal can be characterized by the particular resource mapping 301 and/or the sequence generator for generating the respective sequences of pilot signals 310-318. If the respective techniques are employed for the 3GPP LTE architecture, examples of types of pilot signals include, but are not limited to: cell-specific reference signal (CRS) according to 3GPP TS 36.211 V13.0.0 (2015-12) chapter 6.10.1; DL DRS according to 3GPP TS 36.211 V13.0.0 (2015-12) chapter 6.10.3A; CSI reference signal according to 3GPP TS 36.211 V13.0.0 (2015-12) chapter 6.10.5; UL DRS according to 3GPP TS 36.211 V13.0.0 (2015-12) chapter 5.5.2; and SRS according to 3GPP TS 36.211 V13.0.0 (2015-12) chapter 5.5.3.

Figure 31:
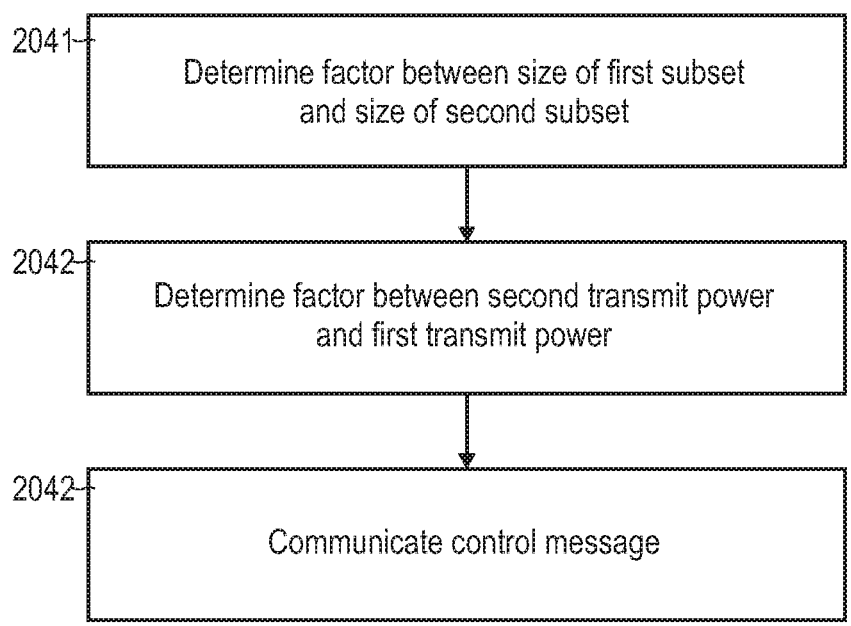
FIG. 31 schematically illustrates a method according to various embodiments.

FIG. 31 is a flowchart of a method according to various embodiments. E.g., the method according to FIG. 31 can be employed in conjunction with the method according to FIG. 30.

At 2041, the factor between the size of the first subset 321 and the size of the second subset 322 is determined. In some scenarios, it can be desirable to transmit a larger number of pilot signals 310-318 at the smaller, first transmit power 231 if compared to the number of pilot signals transmitted at the larger, second transmit power 232; here, the factor may amount to, e.g., 2, 10, 100, or 1000. Larger factors typically correspond to smaller interference.

At 2042, the factor by which the second transmit power 232 is larger than the first transmit power 231 is determined. In some scenarios, it can be desirable to implement a comparably large factor, e.g., amounting to 1 dB, 2 dB, 3 dB, or even more. Thereby, the pilot signals having the second transmit power 232 can be received even in presence of significant path loss, e.g., at remote positions; the corresponding range is increased. At the same time, increased interference may result.

At 2041 and 2042, various decision criteria may be taken into account when determining the respective factors. Example decision criteria include, but are not limited to: mobility; an at least partly random process; an optimization process; a position of the terminal transmitting and/or receiving (communicating) the pilot signal; a handover of the terminal; etc.

E.g., if the position of the terminal is associated with increased inter-cell interference—as may be the case if the terminal is positioned close to the edge of a cell —, a larger factor between the size of the first subset 321 and the size of the second subset 322 may be determined at 2041 and/or a smaller factor between the second transmit power 232 and the first transmit power 231 may be determined at 2042. Thereby, interference is mitigated.

E.g., if a handover of the terminal is imminent, a factor between the size of the first subset 321 and the size of the second subset 322 closer to 1 may be determined. Thereby, accurate channel sensing is facilitated. The handover can be accurately triggered.

At 2042, a control message is communicated between the respective eNB 112, 112-1-112-3 and the respective terminal 130, 130-1-130-4, the control message being indicative of the factors determined at 2041, 2042. E.g., the control message may be implicitly indicative of the factor between the size of the first subset 321 and the size of the second subset 322 determined at 2041 by scheduling a timing 322A of transmission intervals 302 of the second subset 322.

Summarizing, above, techniques have been described which enable to efficiently communicate pilot signals such as UL pilot signals or DL pilot signals or sidelink pilot signals.

In particular, techniques have been described which enable a first terminal receiving UL pilot signals transmitted by at least one second terminal. Thereby, additional information on the condition of the radio link may be collected.

Furthermore, techniques have been described which enable to temporarily boost the transmit power of pilot signals of a given type. In detail, techniques have been described which enable to communicate pilot signals according to a given repetitive resource mapping (i) in a first subset of the sequence of transmission intervals at a first transmit power and (ii) in a second subset of the sequence of transmission intervals at a higher, second transmit power. A sequences of these pilot signals across the first and second subsets may be associated with the same sequence generator. By temporarily boosting the transmit power, reception of the power-boosted pilot signals may be possible for additional entities; thereby, additional information on the condition of the radio link may be collected.

Figure 32:
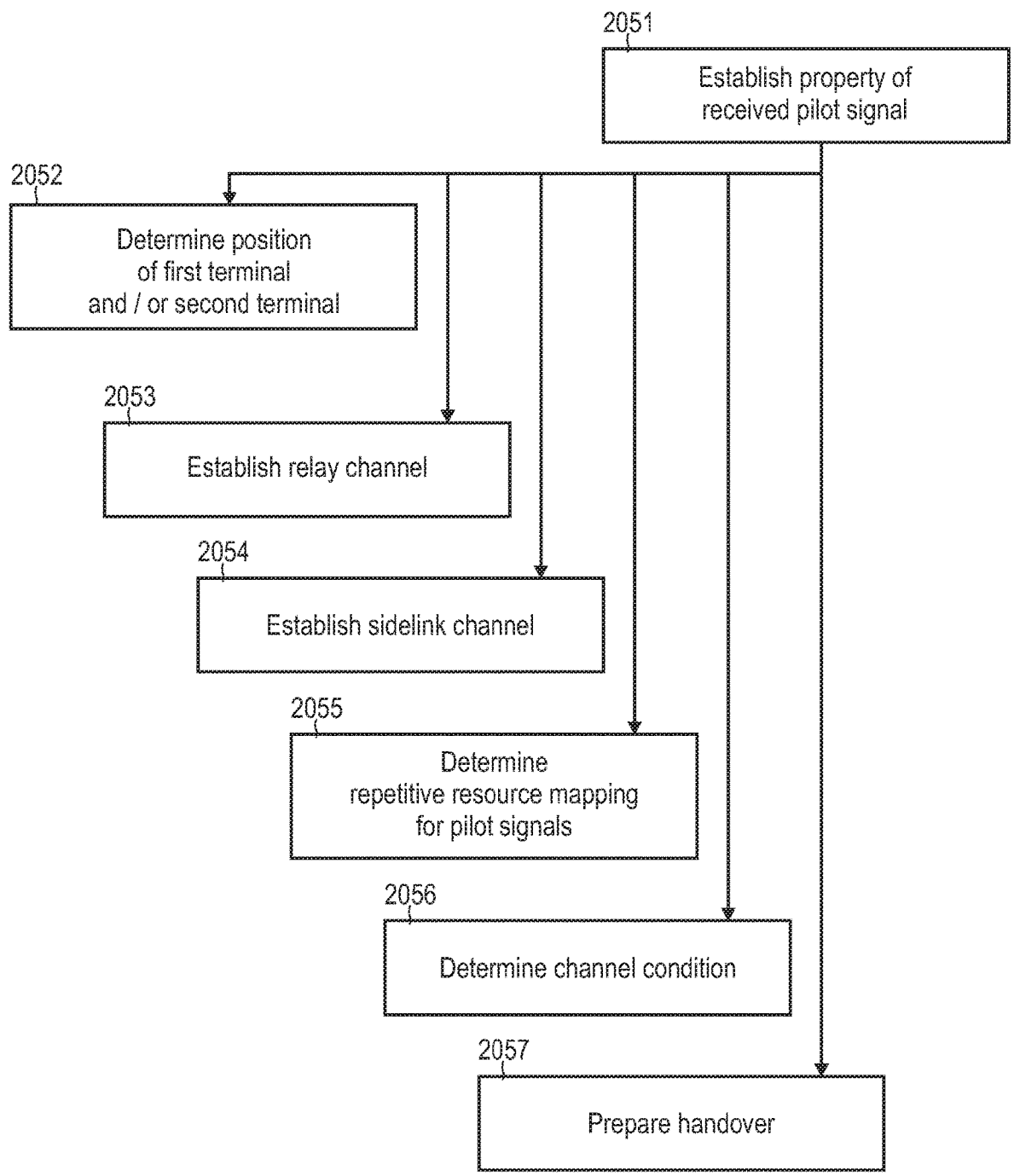
FIG. 32 schematically illustrates a method according to various embodiments.

Such techniques may be employed for various use-cases. FIG. 32 is a flowchart of a method according to various embodiments. FIG. 32 illustrates aspects with respect to various use-cases relying on such additional information on the condition of the radio link.

At 2051, one or more properties of a received at least one pilot signal 310-318 are determined. Such properties may include, but are not limited to: an amplitude of the received at least one pilot signal 310-318; a phase of the received at least one pilot signal 310-318; a resource 305 of the received at least one pilot signal 310-318; a time offset of the received at least one pilot signal 310-318; and an angle of arrival of the received at least one pilot signal 310-318.

These one or more properties can be used according to one or more use-cases according to 2052-2057. The respective use-cases according to 2052-2057 may be employed in isolation or combined with each other.

A first use-case corresponds to 2052. At 2052, the position of a first terminal 130, 130-1-130-4 receiving UL pilot signals 310-318 transmitted by a second terminal 130, 130-1-130-4 is determined. Alternatively or additionally, at 2052, the position of the second terminal 130, 130-1-130-4 transmitting UL pilot signals 310-318 can be determined with respect to the first terminal 130, 130-1-130-4 receiving the UL pilot signals 310-318. E.g., the relative position of the first terminal 130, 130-1-130-4 with respect to the second terminal 130, 130-1-130-4 may be determined. E.g., the relative position may be defined with respect to one or more eNBs 112, 112-1-112-3. E.g., as part of 2052, the travel time of the UL pilot signals 310-318 from the second terminal 130, 130-1-130-4 to the first terminal 130, 130-1-130-4 can be taken into account. Alternatively or additionally, the angle of arrival can be taken into account. Triangulation techniques may be employed. Alternatively or additionally, the travel time of the UL pilot signals 310-318 from the second terminal 130, 130-1-130-4 to the respective eNB 112, 112-1-112-3 can be taken into account. Alternatively or additionally, a travel time of further UL pilot signals 310-318 from the first terminal 130, 130-1-130-4 to the respective eNB 112, 112-1-112-3 can be taken into account. Positioning based on the UL pilot signals 310-318 can be complemented by further positioning techniques; in particular in such a context it may be favorable if the identities of all participating terminals 130, 130-1-130-4 are known to fusion positioning information accurately. Further positioning techniques may include: GPS, compass, gyroscope, pressure sensor; etc. Thus, as can be seen from 2052, it is possible to use power-boosted pilot signals 310-318 as positioning beacons.

Thus, as part of 2052, the terminal 130, 130-1-130-4 that receives/detects a set of UL pilot signals 310-318 originating from other terminals 130, 130-1-130-4 can use such information to locally perform calculations for location information/positioning of the other terminals 130, 130-1-130-4 in relation to itself. In case the first terminal 130, 130-1-130-4 receiving the UL pilot signal has information about its own position available, e.g., by means of a Global Positioning System (GPS) or similar, the first terminal 130, 130-1-130-4 can implement initial location estimates of the second terminals 130, 130-1-130-4. In order to detect the angle of arrival from UL pilot signals 310-318, multiple antenna reception by MIMO or MAMI techniques can be employed. Further angle information can complement such information, e.g., by the use of a compass or another sensor. In further examples, such additional data can also be reported by the first terminal 130, 130-1-130-4 to the eNB 112, 112-1-112-3 as part of the UL report message 902. The UL report message 902 may be transmitted upon a specific request or may be pro-actively/autonomously triggered. By such techniques, it is possible that the received UL pilot signals 310-318 can be combined with further terminal-specific information such as the position, detected angle of arrival, mobility information, compass information, pressure sensor information, etc.; all such information can be used by the network to further combine with available information to improve positioning accuracy. E.g., the network may combine several different UL report messages of terminals 130, 130-1-130-4 to further refine the position estimate. The UL report messages 902 can contain an indicator indicative of the geolocation, e.g., from GPS, and relative position information from multiple terminals 130, 130-1-130-4. Thereby, the network and obtain the geolocation/absolute position of the target terminals 130, 130-1-130-4 in an accurate manner.

A second use-case corresponds to 2053. At 2053, a relay channel is established. E.g., the relay channel can between the first terminal 130, 130-1-130-4 receiving UL pilot signals 310-318 transmitted by the second terminal 130, 130-1-130-4 and a respective eNB 112, 112-1-112-3. E.g., the relay channel can employ the second terminal 130, 130-1-130-4 as a relay. E.g., if the first terminal 130, 130-1-130-4 receives the UL pilot signals 310-318 transmitted by the second terminal 130, 130-1-130-4 and, based on the received UL pilot signals 310-318, it is determined that a path loss between the second terminal 130, 130-1-130-4 and the first terminal 130, 130-1-130-4 is comparably small, it can be judged that establishing of the relay channel is favorable, e.g., in terms of transmission reliability and/or energy consumption.

As an example, at 2053, information obtained from received UL pilot signals 310-318 can be used to select suitable terminals 130, 130-1-130-4 for relay functionality. E.g., a new relay may be selected from a plurality of candidate relays. E.g., the selection of relays may be based on certain device types such as a particular class of terminals 130, 130-1-130-4 defined within the cellular network 100 that are capable of relaying or acting as a forwarding link of information between a further terminal 130, 130-1-130-4 and an eNB 112, 112-1-112-3. In order to understand which terminals 130, 130-1-130-4 are within proximity of each other to, thereby, select suitable devices as a relay, the concept of the first terminal 130, 130-1-130-4 receiving UL pilot signals 310-318 transmitted by at least one second terminal 130, 130-1-130-4 as described herein can be employed. In particular, positioning information derived from 2052, as explained above, can be taken into account as part of 2053, as well.

A third use-case corresponds to 2054. At 2054, a sidelink channel is established. E.g., the sidelink channel can be between a first terminal 130, 130-1-130-4 receiving UL pilot signals 310-318 transmitted by a second terminal 130, 130-1-130-4. E.g., if the first terminal 130, 130-1-130-4 receives the UL pilot signals 310-318 transmitted by the second terminals 130, 130-1-130-4 and it is determined that the path loss between the second terminal 130, 130-1-130-4 and the first terminal 130, 130-1-130-4 is comparably small, it can be judged that establishing the sidelink channel is favorable, e.g., in terms of transmission reliability and/or energy consumption and/or resource allocation and/or delay. Hence, it is possible to use power-boosted pilot signals 310-318 as D2D discovery signals.

A fourth use-case corresponds to 2055. At 2055, a repetitive resource mapping for communicating pilot signals 310-318 is determined. E.g., the repetitive resource mapping 301, 301A can be determined such that resources 305 are shared between two terminals 130, 130-1-130-4 communicating pilot signals 310-318. E.g., the repetitive resource mapping 301, 301A can be determined such that resources 305 are not shared between two terminals 130, 130-1-130-4 communicating pilot signals 310-318; FDMA, TDMA, and/or CDMA may be employed. E.g., at 2055, a position of the two terminals 130, 130-1-130-4 with respect to each other can be taken into account; for this, it is possible to rely on techniques as described above with respect to 2052 and/or further positioning techniques.

As an example, as part of 2055, if there are no UL report messages 902 received by the eNB 112, 112-1-112-3 which indicate activity of UL pilot signals 310-318 in a certain resource, it is likely that this resource is available for communication of pilot signals 310-318. Inter-cell interference is not expected in such resources.

In a further example, as part of 2055, if the eNB 112, 112-1-112-3 has knowledge on the position of the participating terminals 130, 130-1-130-4, resources may be re-used for communicating pilot signals 310-318 in different parts of a cell where no or only little interference is expected. Thus, pilot contamination can be avoided; while, at the same time, resources are efficiently utilized.

A fifth use-case corresponds to 2056. 2056 corresponds to channel sensing. At 2056, a condition of one or more channels 261-263 implemented on the radio link 101 are determined. By considering power-boosted pilot signals 310-318, more data points can be considered when determining the channel condition. Thus, a highly accurate channel sensing can be employed. In particular, channel sensing may be employed for a MIMO channel. Typically, operation of communication on a MIMO channel requires highly-accurate channel sensing. By considering more data points as described above, such highly-accurate channel sensing can be implemented. The techniques may find particular application for MAMI scenarios. E.g., MIMO and/or MAMI channel sensing may rely on reciprocity between UL and DL conditions. Often, MAMI scenarios rely on UL pilot signals 310-318, only. In some examples, frequency division duplex (FDD) channels may be considered. Here, due to the smaller bandwidth validity/coherence, separate UL and DL pilot signals 310-318 may be communicated. Also in a channel having a large bandwidth, multiple pilot signals 310-318 may be communicated at different frequencies in order to sound different subbands.

A sixth use-case corresponds to 2057. At 2057, a handover is prepared. E.g., the handover can be between two neighboring cells. It is also possible that the handover is between a macro cell and the micro cell. By using power-boosted pilot signals 310-318, advance notice of a terminal 130, 130-1-130-4 approaching a cell edge can be established. Thus, an accurate trigger criterion for executing the handover can be taken into account.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., while above various examples have been described with respect to UL pilot signals, respective techniques may be readily implemented with respect to DL pilot signals or sidelink pilot signals.

E.g., while above various examples have been described with respect to E-UTRAN, other RATs can be employed.

E.g., while above various examples have been described with respect a report message indicative of at least one property of a received at least one uplink pilot signal, similar techniques may be readily implemented for a report message indicative of at least one property of a received at least one downlink pilot signal.

E.g., while above reference has been made to repetitive resource mappings, in other examples also non-repetitive resource mappings may be employed.

The invention claimed is:

1. A method, comprising:
a first terminal receiving, on a radio link of a cellular network, at least one uplink pilot signal transmitted by at least one second terminal, and
the first terminal transmitting, on the radio link and to an access node of the cellular network, an uplink report message indicative of at least one property of the at least one uplink pilot signal that was received,
wherein the at least one uplink pilot signal comprises multiple pilot signals, and
wherein the uplink report message comprises an average of the at least one property of the multiple pilot signals.

2. The method of claim 1,
wherein the average of the at least one property of the multiple pilot signals comprises an average of an amplitude and/or a phase of the multiple pilot signals.

3. The method of claim 1,
wherein the at least one second terminal comprises multiple second terminals, and
wherein the average is determined for the at least one property of the multiple pilot signals received from the multiple second terminals.

4. The method of claim 1,
wherein the uplink report message is for channel sensing performed by the access node.

5. The method of claim 1,
wherein the uplink report message is indicative of an average signal amplitude on the radio link.

6. A method, comprising:
an access node of a cellular network receiving, on a radio link of the cellular network and from a first terminal, an uplink report message indicative of at least one property of at least one uplink pilot signal received by the first terminal, the at least one uplink pilot signal being transmitted by at least one second terminal,
wherein the at least one uplink pilot signal comprises multiple pilot signals, and
wherein the uplink report message comprises an average of the at least one property of the multiple pilot signals.

7. The method of claim 6, further comprising:
performing channel sensing based on the uplink report message, to mitigate inter-cell interference.

8. The method of claim 6,
wherein the uplink report message is indicative of an average signal amplitude on the radio link.

9. The method of claim 6,
wherein the at least one second terminal comprises multiple second terminals, and
wherein the average is determined for the at least one property of the multiple pilot signals received from the multiple second terminals.

10. The method of claim 6,
wherein the uplink report message is for channel sensing performed by the access node.

11. An access node of a cellular network, comprising:
an interface configured to transceive on a radio link of the cellular network, and
at least one processor configured to receive, via the interface and from a first terminal, an uplink report message indicative of at least one property of at least one uplink pilot signal received by the first terminal, the at least one uplink pilot signal being transmitted by at least one second terminal,
wherein the at least one uplink pilot signal comprises multiple pilot signals, and
wherein the uplink report message comprises an average of the at least one property of the multiple pilot signals.

12. A terminal attachable configured to be attached to a cellular network, comprising:
an interface configured to transceive on a radio link of the cellular network, and at least one processor configured to receive, via the interface, at least one uplink pilot signal transmitted by at least one further terminal, wherein the at least one processor is further configured to transmit, via the interface and to an access node of the cellular network, an uplink report message indicative of at least one property of the at least one uplink pilot signal that was received, wherein the at least one uplink pilot signal comprises multiple pilot signals, and wherein the uplink report message comprises an average of the at least one property of the multiple pilot signals.

* * * * *

UNITED STATES PATENT AND TRADEMARK OFFICE
CERTIFICATE OF CORRECTION

PATENT NO. : 11,626,951 B2
APPLICATION NO. : 17/348288
DATED : April 11, 2023
INVENTOR(S) : Ljung et al.

It is certified that error appears in the above-identified patent and that said Letters Patent is hereby corrected as shown below:

In the Claims

Column 28, Line 64: Please correct "A terminal attachable configured" to read --A terminal configured--

Signed and Sealed this
Twenty-seventh Day of June, 2023

Katherine Kelly Vidal
*Director of the United States Patent and Trademark Office*